(12) United States Patent
Takeda et al.

(10) Patent No.: US 12,455,472 B2
(45) Date of Patent: Oct. 28, 2025

(54) OPTICAL DEVICE

(71) Applicant: DEXERIALS CORPORATION, Shimotsuke (JP)

(72) Inventors: Tomu Takeda, Tochigi (JP); Hideto Sagawa, Tochigi (JP)

(73) Assignee: DEXERIALS CORPORATION, Shimotsuke (JP)

( * ) Notice: Subject to any disclaimer, the term of this patent is extended or adjusted under 35 U.S.C. 154(b) by 263 days.

(21) Appl. No.: 18/270,124

(22) PCT Filed: Mar. 7, 2022

(86) PCT No.: PCT/JP2022/009686
§ 371 (c)(1),
(2) Date: Jun. 28, 2023

(87) PCT Pub. No.: WO2022/196409
PCT Pub. Date: Sep. 22, 2022

(65) Prior Publication Data
US 2024/0069378 A1    Feb. 29, 2024

(30) Foreign Application Priority Data
Mar. 15, 2021   (JP) .................................. 2021-041786

(51) Int. Cl.
*G02F 1/1335*   (2006.01)
*G02B 5/30*     (2006.01)

(52) U.S. Cl.
CPC ..... *G02F 1/133548* (2021.01); *G02B 5/3058* (2013.01)

(58) Field of Classification Search
None
See application file for complete search history.

(56) References Cited

U.S. PATENT DOCUMENTS

2021/0048573 A1*   2/2021   Takeda ................. G02B 5/3058

FOREIGN PATENT DOCUMENTS

JP   2008-216957 A   9/2008
JP   2010-145608 A   7/2010
(Continued)

OTHER PUBLICATIONS

May 17, 2022 International Search Report issued in International Patent Application No. PCT/JP2022/009686.

*Primary Examiner* — Phu Vu
(74) *Attorney, Agent, or Firm* — Oliff PLC

(57) ABSTRACT

An optical device capable of achieving desired polarization properties including a light source, incident-side polarizing element, optical modulating element, emission-side first polarizing element, and emission-side second polarizing element, the first and second polarizing elements each have a wire-grid structure and include a plurality of convex portions arranged on a transparent substrate and spaced apart from each other at a pitch shorter than the wavelength of light in the light source, the transmission axis of the first polarizing element relative to the transmission axis of the incident-side polarizing element is within ±8.5°, and the convex portions of the second polarizing element are lattice-shaped extending in a predetermined direction and include, in order from the transparent substrate side, a reflection layer, dielectric layer, and absorption layer, the rotation angle of the absorption axis of the second polarizing element relative to the absorption axis of the incident-side polarizing element is within ±0.7°.

12 Claims, 18 Drawing Sheets

(56) References Cited

FOREIGN PATENT DOCUMENTS

| | | |
|---|---|---|
| JP | 2010-210705 A | 9/2010 |
| JP | 5184624 B2 | 4/2013 |
| JP | 5359128 B2 | 12/2013 |
| JP | 2014-164124 A | 9/2014 |
| JP | 2020-140073 A | 9/2020 |
| WO | 2012/118204 A1 | 9/2012 |

* cited by examiner

OPTICAL DEVICE

TECHNICAL FIELD

The present technology relates to an optical device provided with a polarizing element. This application claims priority based on Japanese Patent Application No. 2021-041786 filed in Japan on Mar. 15, 2021, which is hereby incorporated by reference into this application.

BACKGROUND ART

A polarizing element is an optical element that absorbs polarized light in one direction and transmits polarized light in a direction orthogonal thereto. In principle, polarizing elements are required for liquid crystal displays. In particular, in liquid crystal displays such as transmissive liquid crystal projectors that use a light source with a large amount of light, polarizing elements, which are exposed to strong radiation, require excellent heat resistance and light resistance, as well as a size of several centimeters and high extinction ratio and reflectance control. To meet these requirements, wire-grid type inorganic polarizers have been proposed.

The wire-grid type polarizing element has a structure in which a number of conductor wires extending in one direction are arranged on a substrate at a pitch (tens to hundreds of nanometers) narrower than the bandwidth of the wavelength of light used. When light enters this polarizing element, polarized light parallel to the direction of the wires (TE wave (S wave)) cannot be transmitted, while polarized light orthogonal to the direction of the wires (TM wave (P wave)) is transmitted as is.

Wire-grid polarizing elements have excellent heat and light resistance; relatively large elements can be manufactured with a high extinction ratio. The multilayer structure is suitable for liquid crystal projectors and other applications because it also makes it possible to control the reflectance properties, which reduces image quality degradation caused by ghosting and other problems that occur when light returned from the surface of the polarizing element is reflected back inside the liquid crystal projector.

Various wire-grid polarizers have been proposed in this regard.

CITATION LIST

Patent Literature

Patent Document 1: JP 5184624 B
Patent Document 2: JP 5359128 B

SUMMARY OF INVENTION

Technical Problem

For example, Patent Document 1 discloses a polarizing element having on a substrate a wire-grid layer composed of an array of elongated metal elements having a length greater than the wavelength of the incident light and a spacing less than half the wavelength of the incident light.

Further, Patent Document 2 discloses a polarizing element having on a substrate transparent to visible light a diffraction grating-shaped concavo-convex portion and an inorganic particulate layer as part of the convex portion.

However, while these patent documents describe the grid structure of the polarizing element, they do not describe the specific optical properties, nor do they describe how the element is used to fully demonstrate its performance.

In recent years, lighting and display light sources have evolved from mercury lamps to LEDs and then to lasers, and multiple semiconductor lasers (LDs) are used to achieve high luminous flux and high brightness in liquid crystal projectors as well. This requires polarizing elements to have high transmittance properties while withstanding high light intensity and strong light environments. To achieve this, it is necessary to reduce the burden on the emission-side polarizing element, and the use of two polarizing elements, i.e., a pre-polarizing element and a main polarizing element is mandatory, and the way of use is required to fully demonstrate their performance.

The present technology is proposed in view of such conventional circumstances and provides an optical device capable of achieving the desired polarization properties.

Solution to Problem

One aspect of the present technology provides an optical device including: a light source, an incident-side polarizing element, an optical modulating element, an emission-side first polarizing element, and an emission-side second polarizing element, wherein the emission-side first polarizing element has a wire-grid structure and includes a plurality of convex portions arranged on one side of a transparent substrate and spaced apart from each other at a pitch shorter than the wavelength of light in the used band of the light source, the convex portions are lattice-shaped convex portions extending in a predetermined direction, and the lattice-shaped convex portions include, in order from the transparent substrate side, a base-shaped portion with a width in a cross-section orthogonal to the predetermined direction becomes narrower toward the tip and a protruding portion protruding from the base-shaped portion and having absorption properties for the wavelength of light in the used band, the emission-side second polarizing element has a wire-grid structure and includes a plurality of convex portions arranged on one side of the transparent substrate and spaced apart from each other at a pitch shorter than the wavelength of light in the used band of the light source, and the convex portions are lattice-shaped convex portions extending in a predetermined direction, and the lattice-shaped convex portions includes, in order from the transparent substrate side, a reflection layer, a dielectric layer, and an absorption layer, the rotation angle of the orthogonal axis of the emission-side first polarizing element relative to the orthogonal axis of the incident-side polarizing element is within ±8.5°, and the rotation angle of the orthogonal axis of the emission-side second polarizing element relative to the orthogonal axis of the incident-side polarizing element is within ±0.7°.

Another aspect of the present technology provides a method for manufacturing an optical device including a light source, an incident-side polarizing element, an optical modulating element, an emission-side first polarizing element, and an emission-side second polarizing element, wherein the emission-side first polarizing element has a wire-grid structure and includes a plurality of convex portions arranged on one side of a transparent substrate and spaced apart from each other at a pitch shorter than the wavelength of light in the used band of the light source, the convex portions are lattice-shaped convex portions extending in a predetermined direction, and the lattice-shaped convex portions include, in order from the transparent substrate side, a base-shaped portion with a width in a cross-section orthogonal to the predetermined direction becomes narrower toward the tip and a protruding portion protruding from the base-shaped portion and having absorption properties for the wavelength of light in the used band, the emission-side second polarizing element has a wire-grid structure and includes a plurality of convex portions arranged on one side of the transparent substrate and spaced apart from each other at a pitch shorter than the wavelength of light in the used band of the light source, and the convex portions are lattice-shaped convex portions extending in a predetermined direction, and the lattice-shaped convex portions includes, in order from the transparent substrate side, a reflection layer, a dielectric layer, and an absorption layer, the method including: a step of arranging the emission-side first polarizing element so that the rotation angle of the orthogonal axis of the emission-side first polarizing element relative to the orthogonal axis of the incident-side polarizing element is within ±8.5°; and a step of arranging the emission-side second polarizing element so that the rotation angle of the orthogonal axis of the emission-side second polarizing element relative to the orthogonal axis of the incident-side polarizing element is within ±0.7°.

Advantageous Effects of Invention

According to the present technology, by optimizing the orthogonal angular offset of the emission-side first polarizing element and the emission-side second polarizing element, high P-polarization transmittance (Tp) and contrast ratio (CR) can be obtained in the whole band in the visible light region, thereby achieving desired polarization properties.

DESCRIPTION OF EMBODIMENTS

Figure 1:
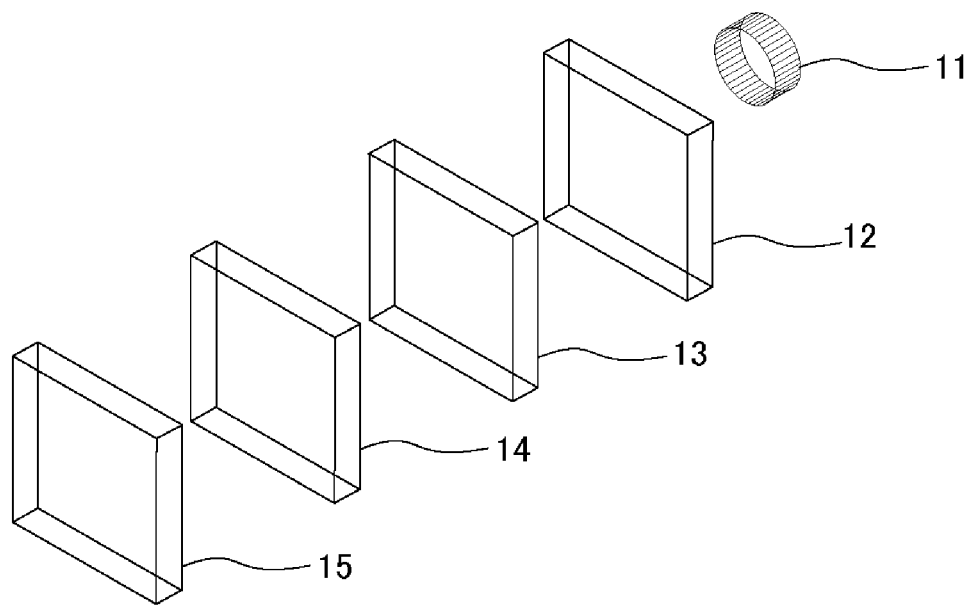
FIG. 1 is a perspective view schematically illustrating a configuration example of an optical device according to this embodiment.

The following is a detailed description of the embodiments of the present technology in the following order with reference to the drawings.
1. OPTICAL DEVICE
2. FIRST EXAMPLE
3. SECOND EXAMPLE
4. THIRD EXAMPLE 1. Optical Device FIG. 1 is a perspective view schematically illustrating a configuration example of an optical device according to this embodiment. As shown in FIG. 1, the optical device 10 of this embodiment includes a light source 11, an incident-side polarizing element 12, an optical modulating element 13, an emission-side first polarizing element 14, and an emission-side second polarizing element 15.

As described later, the emission-side first polarizing element 14 has a wire-grid structure and includes a plurality of convex portions arranged on one side of a transparent substrate and spaced apart from each other at a pitch shorter than the wavelength of light in the used band of the light source, the convex portions are lattice-shaped convex portions extending in a predetermined direction, and the lattice-shaped convex portions include, in order from the transparent substrate side, a base-shaped portion with a width in a cross-section orthogonal to the predetermined direction becomes narrower toward the tip and a protruding portion protruding from the base-shaped portion and having absorption properties for the wavelength of light in the used band.

In addition, as described later, the emission-side second polarizing element 15 has a wire-grid structure and includes a plurality of convex portions arranged on one side of the transparent substrate and spaced apart from each other at a pitch shorter than the wavelength of light in the used band of the light source, and the convex portions are lattice-shaped convex portions extending in a predetermined direction, and the lattice-shaped convex portions includes, in order from the transparent substrate side, a reflection layer, a dielectric layer, and an absorption layer.

In the optical device 10 having such a configuration, by placing the emission-side first polarizing element 14 in front of the emission-side second polarizing element 15, the emission-side first polarizing element 14 absorbs a part of the high-intensity light and dissipates a large amount of heat, thereby improving the tolerance of the emission-side second polarizing element 15 and achieving the desired polarization properties.

Figure 2:
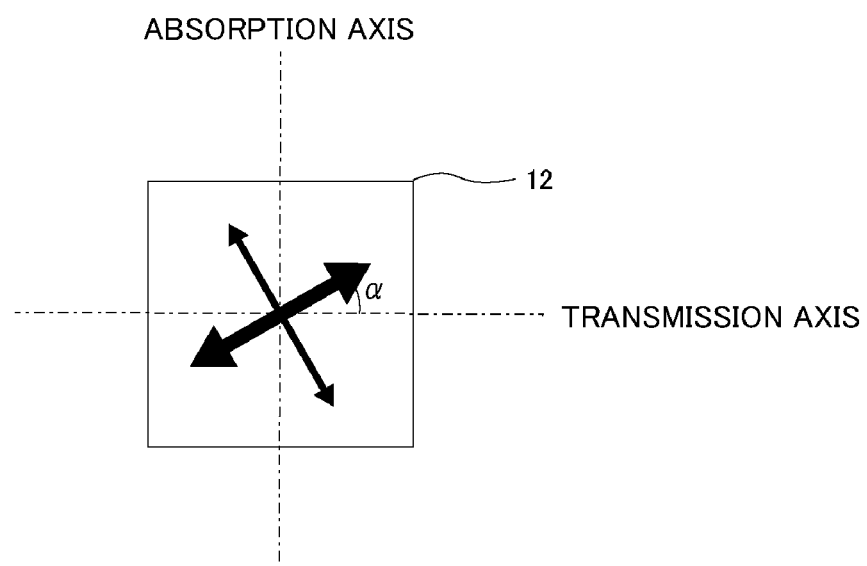
FIG. 2 is an explanatory view of a rotation angle of an incident-side polarizing element relative to the orthogonal axis.

FIG. 2 is an explanatory view of a rotation angle of an incident-side polarizing element relative to the orthogonal axis. As shown in FIG. 2, the incident-side polarizing element 12 and the emission-side first polarizing element 14 are arranged such that the rotation angle $\alpha_1$ of the orthogonal axis of the emission-side first polarizing element 14 relative to the orthogonal axis of the incident-side polarizing element 12 is within ±8.5°, and The incident-side polarizing elements 12 and the emission-side second polarizing element 15 are arranged such that the rotation angle $\alpha_2$ of the orthogonal axis of the emission-side second polarizing element 15 relative to the orthogonal axis of the incident-side polarizing element 12 is within ±0.7°.

In the emission-side first polarizing element 14, when the rotation angle $\alpha_1$ (orthogonal offset angle) relative to the orthogonal axis of the incident-side polarizing element 12 is within ±8.5°, the P-polarization transmittance (Tp) of the whole band in the visible light region is preferably 95% or more, and the change amount in the P-polarization transmittance (Tp) of the whole band in the visible light region from the position with a rotation angle of 0° (rotation angle $\alpha_1$) is preferably −1% or less (decrease of 1% or less). Further, in the emission-side first polarizing element 14, when the rotation angle $\alpha_1$ (orthogonal offset angle) relative to the orthogonal axis of the incident-side polarizing element 12 is within ±8.5°, the contrast ratio (CR) of the whole band in the visible light region is preferably 2.0 or less, and the change amount in the contrast ratio (CR) of the whole band in the visible light region from the position of 0° (rotation angle $\alpha_1$) is preferably −5% or less (decrease of 5% or less).

In the emission-side second polarizing element 15, when the rotation angle $\alpha_2$ (orthogonal offset angle) relative to the orthogonal axis of the incident-side polarizing element 12 is within ±0.7°, the P-polarization transmittance (Tp) of the whole band in the visible light region is preferably 90% or more, and the change amount in the P-polarization transmittance (Tp) of the whole band in the visible light region from the position of 0° (rotation angle $\alpha_2$) is preferably −1% or less (decrease of 1% or less). Further, in the emission-side second polarizing element 15, when the rotation angle $\alpha_2$ (orthogonal offset angle) relative to the orthogonal axis of the incident-side polarizing element 12 is within ±0.7°, the contrast ratio (CR) of all bandwidths in the visible light region is preferably 1,000 or more, and the change amount in the contrast ratio (CR) of all bandwidths in the visible light region from the position of 0° (rotation angle $\alpha_1$) is preferably −20% or less (decrease of 20% or less).

Thus, by providing the emission-side first polarizing element 14 and the emission-side second polarizing element 15 on the emission-side, it will be possible to make the change amount in the P-polarization transmittance (Tp) of the whole band in the visible light region from the position of 0° (rotation angle $\alpha_1$, $\alpha_2$) within −1%, and the change amount in the contrast ratio (CR) of the whole band in the visible light region from the position of 0° (rotation angles $\alpha_1$ and $\alpha_2$) within −20%.

The orthogonal axis of the polarizing element can be set by using, e.g., a spectrophotometer while rotating the sample, such that the angular position where the S-polarization transmittance (Ts) reaches its minimum value is the absorption axis (0°) and the angular position of 90° to the absorption axis is the transmission axis. P-polarization transmittance (Tp) means the transmittance of polarized light (TM wave) in the direction of the transmission axis (X-axis direction) incident on the polarizer. S-polarization transmittance (Ts) means the transmittance of polarized light (TE wave) in the direction of the absorption axis (Y-axis direction) incident on the polarizer.

The following is a detailed description of each component of the optical device 10.

Light Source

The light source 11 may be a laser (LD), LED, and mercury vapor lamp (UHE), among others. In the present embodiment, A plurality of semiconductor lasers capable of achieving high luminous flux and high brightness are preferably used, e.g., a two-dimensional laser array light source corresponding to each RGB color may be used.

Incident-Side Polarizing Element

The incident-side polarizing element 12 is not particularly limited but is preferably an inorganic polarizer having a wire-grid structure and including a plurality of convex portions arranged on one side of a transparent substrate and spaced apart from each other at a pitch shorter than the wavelength of the light in the band used by the light source (used band).

Optical Modulating Element

The optical modulating element 13 is not particularly limited but can be composed of a transmissive liquid crystal element or a reflective liquid crystal display element, among others.

Emission-Side First Polarizing Element (First Configuration Example

Figure 3:
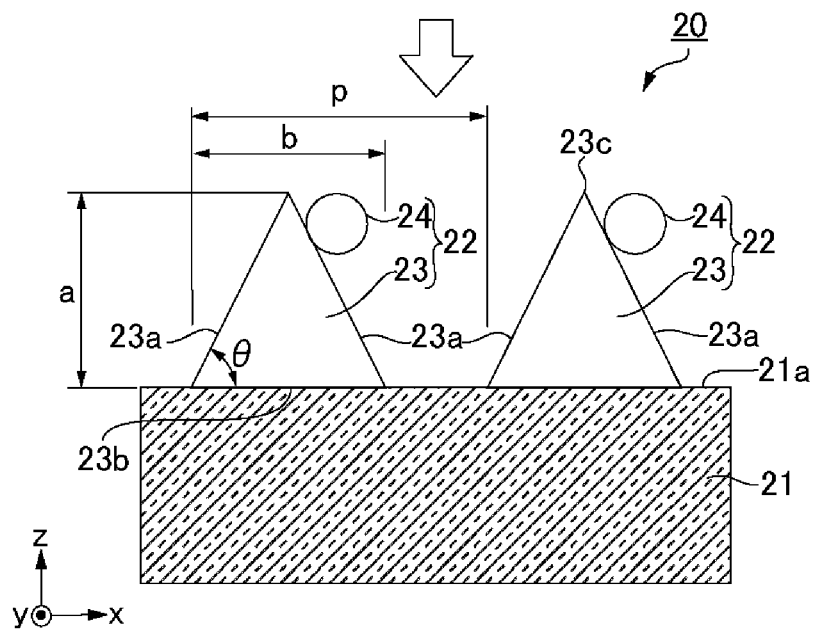
FIG. 3 is a cross-sectional view schematically illustrating a first configuration example of an emission-side first polarizing element.

FIG. 3 is a cross-sectional view schematically illustrating a first configuration example of an emission-side first polarizing element. As shown in FIG. 3, the polarizer 20 shown as a first configuration example of the emission-side first polarizing element 14 has a wire-grid structure and includes a transparent substrate 21 and a plurality of convex portions 22 periodically arranged on the transparent substrate 21 extending in the first direction (y-direction) and spaced from each other at a pitch P shorter than the wavelength of light in the used band, in which the convex portions 22 each includes a base-shaped portion 23 the width of which in a cross-section orthogonal to the first direction (y-direction) is narrower toward the tip, and a protruding portion 24 protruding from the base-shaped portion 23 and having absorptivity for the wavelength of light in the used band.

The polarizer 20 is arranged such that the rotation angle $\alpha_1$ of the orthogonal axis of the polarizer 20 relative to the orthogonal axis of the incident-side polarizing element 12 on the incident-side is within ±8.5°. This makes it possible to make the P-polarization transmittance (Tp) of the whole band in the visible light region 95% or more, and the change amount in the P-polarization transmittance (Tp) of the whole band in the visible light region from the position of 0° (rotation angle $\alpha_1$) within −1%.

As shown in FIG. 3, the plane on which the main surface 21a of the transparent substrate 21 spreads is the xy-plane, the direction in which the convex portion 22 extends (first direction) is the y-direction, and the direction orthogonal to the y-direction and in which the convex portion is arranged in the x-direction. The direction orthogonal to the xy plane is the z-direction. FIG. 3 shows an example in which the light incident on the polarizer 20 is incident from the z-direction on the side of the transparent substrate 21 on which the convex portion 22 is formed (grid side), but the light incident on the polarizer 20 may be incident from the transparent substrate 21 side.

The polarizer 20 utilizes four actions: transmission, reflection, interference, and selective optical absorption of polarization waves due to optical anisotropy to attenuate polarization waves with electric field components parallel to the y-direction (TE waves (S waves)) and transmit polarization waves with electric field components parallel to the x-direction (TM waves (P waves)). Thus, in FIG. 3, the y-direction is the direction of the absorption axis of the polarizer and the x-direction is the direction of the transmission axis of the polarizer.

The light incident from the side of the polarizer 20 on which the convex portion 22 is formed (grid side) is partially absorbed and attenuated when passing through the protruding portion 24. The TM wave (P wave) of the light transmitted through the protruding portion 24 has a high transmittance and transmits through the transparent substrate 21. On the other hand, the TE wave (S wave) of the light transmitted through the protruding portion 24 is reflected by the transparent substrate 21. The TE waves reflected from the transparent substrate 21 are interfered with and attenuated as they pass through the protruding portion 24. By selectively attenuating TE waves as described above, the polarizer 20 is able to achieve the desired polarization properties.

Transparent Substrate

The transparent substrate 21 is not particularly limited as long as it is transparent to light of wavelengths in the used band of the polarizer 20 and may be selected as appropriate according to the purpose. It should be noted that "transparent" in this description does not require 100% transmission of light of the wavelength of the band used, but only enough to allow the polarizer to maintain its function as a polarizer. The average thickness of the transparent substrate 20 is preferably between 0.3 to 1 mm. The light in the used band is, for example, visible light with a wavelength of about 380 to 810 nm.

The transparent substrate 21 is preferably formed of a material with a refractive index of 1.1 to 2.2, and examples of the material may include glass, crystal, and sapphire. From the viewpoint of cost and translucency, glass, especially quartz glass (refractive index 1.46) or soda lime glass (refractive index 1.51) is preferred. The composition of the glass material is not particularly limited, and inexpensive glass materials such as silicate glass, which is widely distributed as optical glass, for example, may be used. From the viewpoint of thermal conductivity, it is preferable to use quartz or sapphire, which have high thermal conductivity. This provides high light resistance to strong light and is preferably used as a polarizer for the optical engine of projectors that generate a lot of heat.

When using transparent substrates made of optically active crystals such as quartz, it is preferable to arrange the convex portion in a direction parallel or orthogonal to the optical axis of the crystal. This results in excellent optical properties. Here, the optical axis is the directional axis where the difference in refractive index between O (ordinary rays) and E (extraordinary rays) of light traveling in that direction is minimized.

Convex Portion

The convex portions 22 extend in the y-direction on the transparent substrate 21 and are periodically arranged in the x-direction and spaced from each other at a pitch P shorter than the wavelength of the light in the used band. The convex portions 22 include the base-shaped portion 23, the width of which in the xz cross-section orthogonal to the y-direction is narrower toward the tip, and the protruding portion 24 protruding from the base-shaped portion 23 and having absorptivity for the wavelength of the light in the used band.

The pitch (spacing repeated in the x-direction) of the convex portions 22, indicated by the sign P in FIG. 3, is not particularly limited as long as it is shorter than the wavelength of the light in the used band. From the viewpoint of ease of fabrication and stability, the convex portion preferably has a pitch of 100 to 200 nm, for example. The pitch of the convex portion can be measured by observation with a scanning electron microscope or transmission electron microscope. For example, the pitch can be measured at any four locations using a scanning electron microscope or transmission electron microscope, and the arithmetic mean of the four locations can be regarded as the pitch of the convex portion. This measurement method is hereinafter referred to as the electron microscopy method.

Base-Shaped Portion

The base-shaped portion 23 is formed so that the width of the xz cross-section orthogonal to the y-direction becomes narrower toward the tip. The width of the xz cross-section may be tapered toward the tip in various ways. The base-shaped portion 23 may be approximately triangular in the xz cross-section orthogonal to the y-direction. The approximately triangular shape is preferably an approximately isosceles triangle. Here, the approximately triangular shape does not have to be strictly triangular but can be approximately triangular as long as it is effective. For example, it may be trapezoidal with a chipped tip. Since the convex portion is a very fine structure, the tapered shape may be rounded to a certain degree in manufacturing, which is also included in the above approximately triangular shape. In addition, the approximately triangular inclined surface (23a in FIG. 3) of the convex portion may have some curvature, and this case is also included in the approximately triangular shape described above.

The dimensions of the base-shaped portion 23 are explained using FIG. 3. The height of the base-shaped portion 23 is the dimension in the z-direction from the bottom surface 23b (main surface 21a of the transparent substrate 21) to the tip 23c of the base-shaped portion 23, which is indicated by the sign a in FIG. 3. The width of the base-shaped portion 23 is the dimension in the x-direction of the bottom surface 23b of the base-shaped portion 23 in the xz cross-section, which is indicated by the sign b in FIG. 3.

The height a of the base-shaped portion 23 is set appropriately in the range of tens to hundreds of nm. The height of the base-shaped portion 23 can be measured, e.g., by the electron microscopy method described above. The height a of the base-shaped portion 23 is preferably in the range of 50 to 130 nm, for example. The ratio of the height a to the width b of the base-shaped portion 23 is preferably $(a/b)>1/2$, more preferably $13/10 \geq (a/b) \geq 7/10$, and even more preferably $13/10 \geq (a/b) \geq 9/10$ from the viewpoint of improving the transmittance.

The width b of the base-shaped portion 23 is set appropriately in the range of tens to hundreds of nm. The width of the base-shaped portion 21 can be measured, e.g., by the electron microscopy method described above. The width b of the base-shaped portion 23 is preferably in the range of 80 to 120 nm, for example. The ratio of the height a to the width b of the base-shaped portion 23 is preferably $(a/b)>1/2$, more preferably $13/10 \geq (a/b) \geq 7/10$, and even more preferably $13/10 \geq (a/b) \geq 9/10$ from the viewpoint of improving the transmittance.

The ratio of the width b of the base-shaped portion 23 to the area "P−b" where the base-shaped portion 23 is not formed is preferably $6/1 \geq (b/P-b) \geq 4/3$.

The base-shaped portion 23 may comprise the same material as the transparent substrate 21. The base-shaped portion 23 and the transparent substrate 21 may be formed as a single piece, or the base-shaped portion 23 made of the same material as the transparent substrate 21 may be formed on the transparent substrate 21. In the former case, the base-shaped portion 23 is formed on the main surface 21a of the transparent substrate 21 by processing (e.g., selectively etching) the main surface of the transparent base plate (the substrate before being processed into the transparent substrate 21 is referred to as the transparent base plate).

The base-shaped portion 23 may comprise a dielectric different from the transparent substrate 21. In this case, the thickness of the dielectric film (height a of the base-shaped portion 23) is set appropriately in the range of tens to hundreds of nm. The thickness of the dielectric can be measured, e.g., by the electron microscopy method described above. The ratio of the film thickness of the dielectric (height a of the base-shaped portion 21) to the width b is preferably $(a/b)>1/2$, more preferably $13/10 \geq (a/b) \geq 7/10$, and even more preferably $13/10 \geq (a/b) \geq 9/10$ from the viewpoint of improving the transmittance.

Dielectric materials may include Si oxides such as $SiO_2$, metal oxides such as $Al_2O_3$, beryllium oxide, and bismuth oxide, $MgF_2$, cryolite, germanium (Ge), titanium dioxide, silicon, magnesium fluoride, boron nitride, boron oxide, tantalum oxide, carbon, or combinations thereof, and other common materials. Among them, the preferred dielectric is Si oxide. The refractive index of the dielectric is preferably greater than 1.0 and 2.5 or less. Since the optical properties of the protruding portion are also affected by the surrounding refractive index, the polarizer properties can be controlled by the choice of dielectric material. The base-shaped portion 23 made of dielectric can be formed as a high-density film by vapor deposition, sputtering, CVD (chemical vapor deposition), or ALD (atomic layer deposition) methods.

Protruding Portion

The protruding portion 24 protrudes from the base-shaped portion 23 and is absorptive to the wavelength of light in the used band. Protruding from the base-shaped portion 21 means, as explained with respect to FIG. 3, that it is formed so as to protrude from the inclined surface 23a or tip (apex) 23c of the base-shaped portion 23.

The protruding portions 24 may be particulate in xz cross-section and may be arranged in an array extending in the y-direction, which is the absorption axis. In this case, the protruding portions 24 constitute a wire-grid structure and function as a wire-grid polarizer which attenuates polarization waves having an electric field component in the direction parallel to the longitudinal direction of the protruding portions 24 (TE waves (S waves)) and transmits polarization waves having an electric field component in the direction orthogonal to the longitudinal direction of the protruding portion 22 (TM waves (P waves)).

The protruding portion 24 is preferably formed of one or more materials having light-absorbing effects with optical constants of non-zero extinction constant, such as metallic and semiconductor materials, and are selected according to the wavelength range of the light to be applied. Metallic materials may include single elements such as Ta, Al, Ag, Cu, Au, Mo, Cr, Ti, W, Ni, Fe, and Sn, or alloys containing one or more of these elements. Semiconductor materials may include Si, Ge, Te, ZnO, and silicide materials (e.g., $\beta$-$FeSi_2$, $MgSi_2$, $NiSi_2$, $BaSi_2$, $CrSi_2$, $CoSi_2$, and $TaSi$). By using these materials, the polarizer has a high extinction ratio for the applied visible light range.

When the protruding portion 24 is formed of a semiconductor material, the bandgap energy must be lower than the used band because the bandgap energy of the semiconductor is involved in the absorption effect. For example, when used in visible light, it is necessary to use a material with absorption at a wavelength of 400 nm or more, i.e., a band gap of 3.1 eV or less.

If the protruding portion 24 is approximately circular in shape in the xz cross-section, its radius is set approximately in the range of several nm to several hundred nm. The radius of the protruding portion 24 can be measured, e.g., by the electron microscopy method described above. In the case of the protruding portion 24 being an approximately circular shape, the radius is preferably in the range of 5 to 100 nm, for example.

The film thickness of the protruding portion 24 (thickness of the protrusion relative to the base-shaped portion 21) is not particularly limited, e.g., 5 to 100 nm is preferred. The film thickness of the protruding portion 24 can be measured, e.g., by the electron microscopy method described above.

The position of the protruding portion 24 on the base-shaped portion 23 is not particularly limited and can be either on the inclined surface of the base-shaped portion 23 or at the tip. The position of the protruding portion 24 on the base-shaped portion 23 is preferably within 3/4 of the area from the tip to the bottom of the base-shaped portion 23, and more preferably within 1/2 of the area from the tip to the bottom of the base-shaped portion 23. This is because the protruding portion 24 may also be positioned on the main surface of the transparent substrate in the manufacturing process if the protruding portion 24 is positioned closer to the bottom of the base-shaped portion 23.

The protruding portions 24 can be formed by known dry methods such as vapor deposition and sputtering. In this case, the protruding portions 24 can also be formed on an inclined surface of the base-shaped portion 23 by an oblique vapor deposition or a sputtering method. After forming the protruding portions 24 on one inclined surface of the base-shaped portion 23, the protruding portions 24 can be further formed on the other inclined surface. In the former case, the protruding portion 24 is formed in an asymmetric position relative to the base-shaped portion 23 when viewed in plan from the z-direction. In the latter case, the protruding portion 24 can be formed in a position symmetrical relative to the base-shaped portion 23 when viewed in plan view from the z-direction. The protruding portion 23 may be formed by a known wet method. The protruding portion 23 may be composed of two or more layers of different constituent materials.

Protective Film

The polarizer of this embodiment may be covered with a protective film composed of a dielectric on the surface of the light-incident side to the extent that it does not affect changes in optical properties.

Water-Repellent Film

In addition, the polarizer of this embodiment may have the surface of the light-incident side covered with an organic water-repellent film. The organic water-repellent film may be composed of fluorinated silane compounds such as perfluorodecyltriethoxysilane (FDTS) and can be formed by using the CVD or ALD methods described above. This can improve the reliability of the polarizer, such as moisture resistance.

Emission-Side First Polarizing Element (Second Configuration Example

Figure 4:
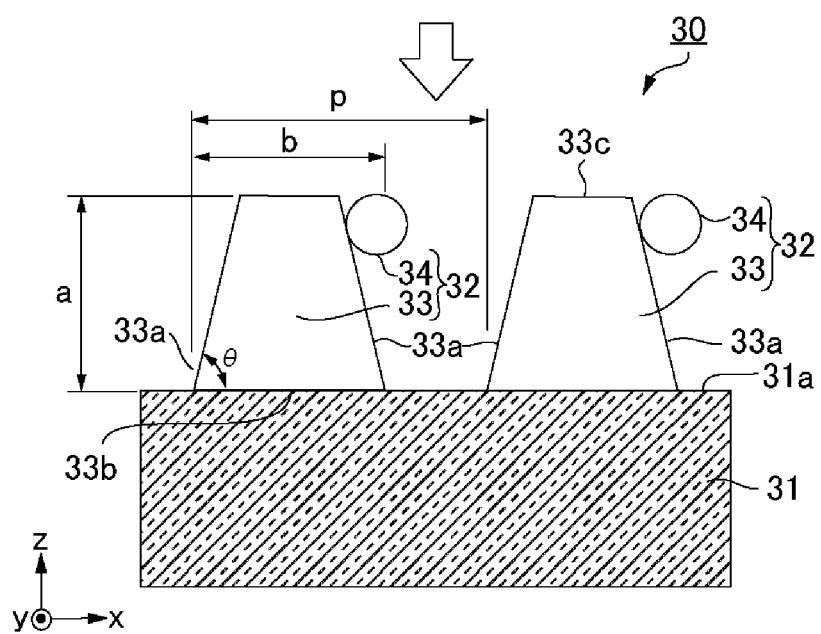
FIG. 4 is a cross-sectional view schematically illustrating a second configuration example of the emission-side first polarizing element.

FIG. 4 is a cross-sectional view schematically illustrating a second configuration example of the emission-side first polarizing element. As shown in FIG. 4, the polarizer 30 shown as a second configuration example of the emission-side first polarizing element 14 has a wire-grid structure and includes a transparent substrate 31 and a plurality of convex portions 32 periodically arranged on the transparent substrate 31 extending in a first direction (y-direction) and spaced from each other at a pitch P shorter than the wavelength of light in the used band, in which the convex portions 32 each includes a base-shaped portion 33 the width of which in a cross-section orthogonal to the first direction (y-direction) is narrower toward the tip, and a protruding portion 34 protruding from the base-shaped portion 33 and having absorptivity for the wavelength of light in the used band.

The polarizer 30 is arranged such that the rotation angle $\alpha_1$ of the orthogonal axis of the polarizer 30 relative to the orthogonal axis of the incident-side polarizing element 12 on the incident-side is within ±8.5°. This makes it possible to make the P-polarization transmittance (Tp) of the whole band in the visible light region 95% or more, and the change amount in the P-polarization transmittance (Tp) of the whole band in the visible light region from the position of 0° (rotation angle $\alpha_1$) within −1%.

As shown in FIG. 4, the plane on which the main surface 31a of the transparent substrate 31 spreads is the xy-plane, the direction in which the convex portion 32 extends (first direction) is the y-direction, and the direction orthogonal to the y-direction and in which the convex portion 32 is arranged in the x-direction. The direction orthogonal to the xy plane is the z-direction. FIG. 4 shows an example in which the light incident on the polarizer 30 is incident from the z-direction on the side of the transparent substrate 31 on which the convex portion 32 is formed (grid side), but the light incident on the polarizer 30 may be incident from the transparent substrate 31 side.

The base-shaped portion of the polarizer 30 shown as the second configuration example has a different shape compared to the first configuration example. Specifically, the base-shaped portion 21 of the first configuration example has a triangular xz cross-section, whereas the base-shaped portion 33 of the second configuration example has a trapezoidal xz cross-section. The transparent substrate 31 and the protruding portion 34 are similar to the transparent substrate 21 and the protruding portion 24 of the first configuration example, respectively, and are therefore omitted from this description.

The base-shaped portion 33 may be an approximately trapezoidal shape in the xz cross-section orthogonal to the y-direction. The approximately trapezoidal shape is preferably such that the two inclined surfaces 33a connecting the top surface 33c and the bottom surface (base) 33b have equal length, and the angle θ formed by the inclined surfaces 33a and the bottom surface 33b are equal. This shape is a trapezoid symmetrical about an axis parallel to the z-axis.

Here, this trapezoidal shape does not have to be a strict trapezoidal shape but can be approximately trapezoidal as long as it is effective. Since the convex portion is a very fine structure, the tapered shape may be rounded to a certain degree in manufacturing, which is also included in the above approximately trapezoidal shape. In addition, the inclined surface (33a in FIG. 4) of the approximately trapezoidal shape of the convex portion may have some curvature, and this case is also included in the approximately trapezoidal shape.

The dimensions of the base-shaped portion 33 are explained by using FIG. 4. The height of the base-shaped portion 33 is the dimension in the z-direction from the bottom surface 33b (main surface 31a of the transparent substrate 31) to the top surface 33c of the base-shaped portion 33, which is indicated by the sign a in FIG. 4. The width of the base-shaped portion 33 is the dimension in the x-direction of the bottom surface 33b of the base-shaped portion 33 in the xz cross-section, which is indicated by the sign b in FIG. 4.

The shape and material of the base-shaped portion 33 can be the same as those described for the base-shaped portion 23 of the first configuration example.

Emission-Side First Polarizing Element
(Modification

In the first and second configuration examples, the transparent substrate may be a laminate of a first substrate made of a first material and a second substrate made of a second material. In this case, it is preferred that the first substrate is placed on the base-shaped portion side and the first material is the same as the material of the base-shaped portion. The material of the second substrate can be the same as that described as the material of the transparent substrate.

In the first and second configuration examples, a phase difference compensation layer may be formed on the surface of the light-incident side. The phase difference compensation layer is composed of a multilayer film using, e.g., an inorganic material having optical anisotropy and can be formed by using, e.g., an oblique vapor deposition or a sputtering method. This enables the correction of polarization disturbance after passing through the liquid crystal panel.

Emission-Side Second Polarizing Element

Figure 5:
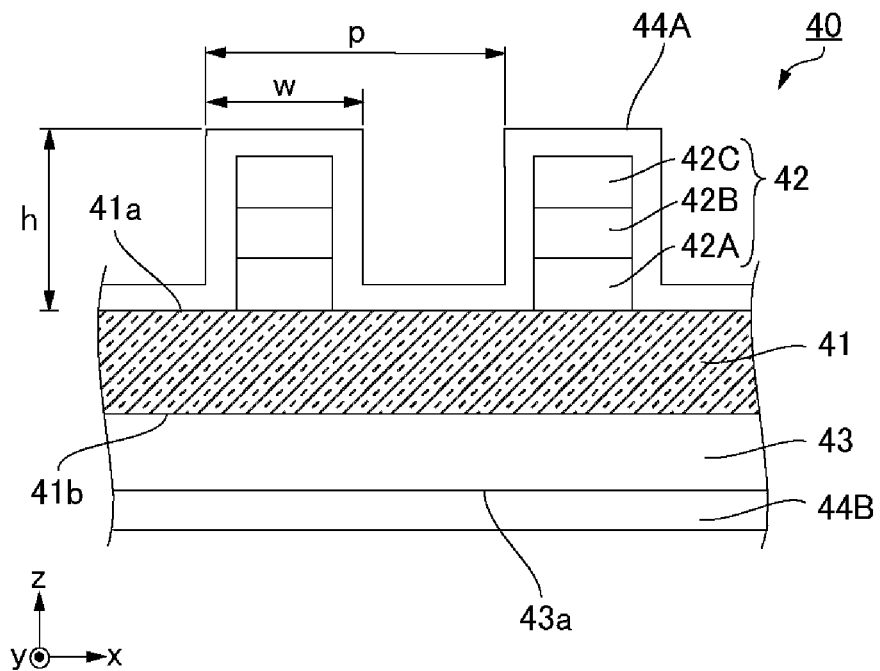
FIG. 5 is a cross-sectional view schematically illustrating a configuration example of the emission-side second polarizing element.

FIG. 5 is a cross-sectional view schematically illustrating a configuration example of the emission-side second polarizing element. As shown in FIG. 5, the polarizer 40 shown as a first configuration example of the emission-side second polarizing element 15 has a wire-grid structure and includes a transparent substrate 41, a plurality of convex portions 42 formed on the first side 41a of the transparent substrate 41, extending in the first direction, and periodically arranged and spaced from each other at a pitch shorter than the wavelength of light in the used band, and an anti-reflection layer 43 formed on the second side 41b opposite the first side 41a of the transparent substrate 41, in which the plurality of convex portions 42 have, in order from the transparent substrate 41 side, a reflection layer 42A, a dielectric layer 42B composed of a first dielectric, and an absorption layer 42C, and the respective surfaces 42a of the plurality of convex portions 42 and the surface 43a of the anti-reflection layer 43 are respectively covered with protective films 44A and 44B, each composed of a second dielectric.

The polarizer 40 is arranged such that the rotation angle $\alpha_2$ of the orthogonal axis of the polarizer 40 relative to the orthogonal axis of the incident-side polarizing element 12 is within ±0.7°. This makes it possible to make the P-polarization transmittance (Tp) of the whole band in the visible light region 90% or more, and the change amount in the contrast ratio (CR) of the whole band in the visible light region from the position of 0° (rotation angle $\alpha_2$) within −20%.

As shown in FIG. 5, the plane on which the main surface 41a of the transparent substrate 41 spreads is the xy-plane, and the direction in which the plurality of convex portions 42 extend (first direction) is the Y-axis direction. The direction orthogonal to the Y-axis direction and in which the plurality of convex portions 42 are arranged along the main surface of the transparent substrate 41 is the X-axis direction. The direction orthogonal to the Y-axis direction and the X-axis direction and orthogonal to the main surface of the transparent substrate is the Z-axis direction. FIG. 5 shows an example in which the light incident on the polarizer 40 is incident from the z-direction on the side of the transparent substrate 41 on which the convex portions 42 are formed (grid side), but the light incident on the polarizer 40 may be incident from the transparent substrate 41 side.

The light incident from the side of the polarizer 40 on which the plurality of convex portions 42 are formed (grid face side) is partially absorbed and attenuated when passing through the absorption layer 42C and the dielectric layer 42B. The polarization wave (TM wave (P wave)) of the light transmitted through the absorption layer 42C and the dielectric layer 42B transmits through the reflection layer 42A with high transmittance. On the other hand, the polarization wave (TE wave (S wave)) of the light transmitted through the absorption layer 42C and the dielectric layer 42B is reflected by the reflection layer 42A. The TE wave reflected in the reflection layer 42A is partially absorbed and partially reflected back to the reflection layer 42A when passing through the absorption layer 42C and the dielectric layer 42B. The TE waves reflected from the reflection layer 42A are interfered with and attenuated as they pass through the absorption layer 42C and the dielectric layer 42B. Thus, by selectively attenuating the TE waves, the polarizer 40 can achieve the desired polarization properties.

In the polarizer 40 shown in FIG. 5, the height h of the grid is a dimension in the Z-axis direction orthogonal to the main surface of the transparent substrate 41, meaning the height of the plurality of convex portions 42 with a protective film (height (thickness) h1). The width w means a dimension in the X-axis direction orthogonal to the height h direction when viewed from the Y-axis direction along the direction in which the plurality of convex portions 42 with the protective film 44A extend. When the polarizer 40 is viewed from the Y-axis direction along the direction in which the plurality of convex portions 42 extend, the repetition interval of the plurality of convex portions 42 in the X-axis direction is referred to as the pitch p.

In the polarizer 40, the pitch p of the plurality of convex portions 42 is not partially limited as long as it is shorter than the wavelength of light in the used band. From the viewpoint of ease of fabrication and stability, the pitch p of the plurality of convex portions 42 is preferably, e.g., 100 to 200 nm. The pitch p of the plurality of convex portions 42 can be measured by observation with a scanning electron microscope or transmission electron microscope. For example, the pitch p can be measured at any four locations by using a scanning electron microscope or a transmission electron microscope, and the arithmetic mean of the measurements can be used as the pitch p of the plurality of convex portions 42.

By optimizing the thickness of the protective film 44A covering the grid top portions as well as the space between the grids and the thickness of the protective film 44B on the anti-reflection layer 43, the polarizer 40 can improve the light transmission properties in the transmission axis direction while maintaining durability.

Transparent Substrate

This is the same as the transparent substrate 21 in the configuration example of the emission-side first polarizing element, so the explanation is omitted here.

Reflection Layer

The reflection layer 42A is formed on the transparent substrate 41 and consists of an array of metal films extending in a strip-like pattern in the Y-axis direction, which is the absorption axis. The reflection layer 42A functions as a wire-grid polarizer, attenuating polarization waves with electric field components in the direction parallel to the longitudinal direction of the reflection layer 42A (TE waves (S waves)) and transmitting polarization waves with electric field components in the direction orthogonal to the longitudinal direction of the reflection layer 42A (TM waves (P waves)). The thickness of the reflection layer 42A is not particularly limited, e.g., 100 to 300 nm is preferred. The thickness of the reflection layer 42A can be measured, e.g., by the electron microscopy method described above.

The constituent material of the reflection layer 42A is not particularly limited as long as it is a material that is reflective to the light in the used band and may include single elements such as Al, Ag, Cu, Mo, Cr, Ti, Ni, W, Fe, Si, Ge, Te, or an alloy containing one or more of these elements. Among them, it is preferred that the reflection layer 42A be composed of aluminum (Al) or an aluminum alloy from the viewpoint of keeping the absorption loss in the wire grid in the visible light region small and from the viewpoint of cost. In addition to these metallic materials, it may also be composed of an inorganic film or a resin film other than metal with a high surface reflectance formed by, e.g., coloring.

The reflection layer 42A can be formed as a high-density film by using, e.g., vapor deposition or sputtering methods. The reflection layer may be composed of two or more layers of different constituent materials.

Dielectric Layer

The dielectric layer 42B is formed on the reflection layer 42A and is an array of dielectric films that extend in a strip-like pattern in the Y-axis direction, which is the absorption axis. The thickness of the dielectric layer 42B is formed in a range where the phase of the polarized light transmitted through the absorption layer 42C and reflected by the reflection layer 42A is shifted by half a wavelength relative to the polarized light reflected by the absorption layer 42C. Specifically, the thickness of the dielectric layer 42B is set appropriately in the range of 1 to 500 nm, where the phase of polarized light can be adjusted to enhance the interference effect. The thickness of the dielectric layer 42B can be measured, e.g., by the electron microscopy method described above. The dielectric layer 42B is also formed as a barrier layer to suppress the interdiffusion of the constituent elements of the reflection layer 42A and the absorption layer 42C described later.

The first dielectric that constitutes the dielectric layer 42B may include Si oxides such as $SiO_2$, metal oxides such as $Al_2O_3$, beryllium oxide, and bismuth oxide, $MgF_2$, cryolite, germanium, titanium dioxide, silicon, magnesium fluoride, boron nitride, boron oxide, tantalum oxide, carbon, or combinations thereof, and other common materials. Among them, from the viewpoint of permeability and barrier layer function, it is preferred that the dielectric layer 42B is composed of one or more oxides selected from the group consisting of Si oxide, Ti oxide, Zr oxide, Al oxide, Nb oxide, and Ta oxide.

The refractive index of the dielectric layer 42B is preferably greater than 1.0 and 2.5 or less. Since the optical properties of the reflection layer 42A are also affected by the surrounding refractive index, the optical properties of the polarizer can be controlled by selecting the material of the dielectric layer 42B. By appropriately adjusting the thickness and refractive index of the dielectric layer 42B, for TE waves reflected in the reflection layer 42A, some of them can be reflected back to the reflection layer 42A when transmitted through the absorption layer 42C, and the light passing through the absorption layer 42C can be attenuated by interference. In this way, the desired polarization properties can be obtained by selectively attenuating the TE wave.

The dielectric layer 42B can be formed as a high-density film by using vapor deposition, sputtering, CVD, or ALD methods. The dielectric layer may be composed of two or more layers with different constituent materials.

Absorption Layer

The absorption layer 42C has an absorption effect on the wavelength of light in the used band and is formed on the dielectric layer 42B and arranged so as to extend in a strip-like pattern in the Y-axis direction, which is the absorption axis. The thickness of the absorption layer 42C is not particularly limited, e.g., 5 to 50 nm is preferred. The thickness of the absorption layer 42C can be measured, e.g., by the electron microscopy method described above.

The absorption layer 42C is preferably composed of one or more materials selected from the group consisting of metals, alloy materials, and semiconductor materials. The constituent material of the absorption layer 42C is selected according to the wavelength range of the light to be used. Metallic materials may include single elements such as Ta, Al, Ag, Cu, Au, Mo, Cr, Ti, W, Ni, Fe, and Sn, or alloys containing one or more of these elements. Semiconductor materials may include Si, Ge, Te, ZnO, and silicide materials (e.g., $\beta$-$FeSi_2$, $MgSi_2$, $NiSi_2$, $BaSi_2$, $CrSi_2$, $CoSi_2$, and TaSi). By using these materials, the polarizer has a high extinction ratio for the applied visible light range. In particular, it is preferred that the absorption layer 42C is composed of Si as well as Fe or Ta.

When a semiconductor material is used as the absorption layer 42C, the band gap energy must be lower than the used band because the band gap energy of the semiconductor is involved in the absorption action. For example, when used in visible light, it is necessary to use a material that absorbs light at a wavelength of 400 nm or more, i.e., a band gap of 3.1 eV or less.

The absorption layer 42C can be formed as a high-density film by using, e.g., vapor deposition or sputtering methods. The absorption layer 42C may be composed of two or more layers with different constituent materials.

Anti-Reflection Layer

The anti-reflection layer 43 is formed on the second side 41b of the transparent substrate 41. The anti-reflection layer 43 can be made of known anti-reflection materials, e.g., a multilayer film consisting of at least two or more layers of materials that can constitute the dielectric layer 42B.

Figure 6:
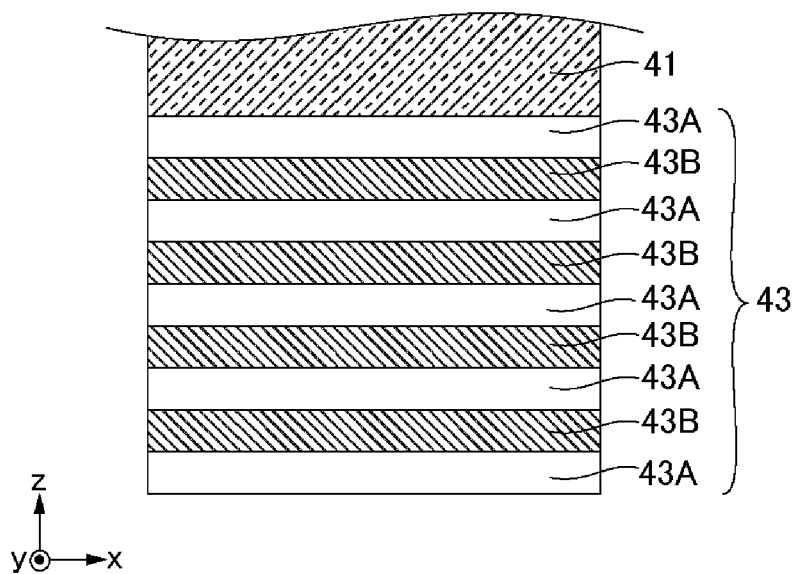
FIG. 6 is a cross-sectional view schematically illustrating a configuration example of the anti-reflection film.

FIG. 6 is a cross-sectional view schematically illustrating a configuration example of the anti-reflection film. As shown in FIG. 6, by alternately stacking a low-refractive index layer 43A and a high-refractive index layer 43B having different refractive indices, the anti-reflection film 43 can attenuate the interfacially reflected light by interference. The thickness of the anti-reflection layer 43 is not particularly limited and is set appropriately in the range of 1 to 500 nm per dielectric layer constituting the dielectric layer 42B. The thickness of the anti-reflection layer 43 can be measured, e.g., by the electron microscopy method described above.

The low-refractive index layer 43A is a layer mainly composed of $SiO_2$ (oxide of Si) or the like. The refractive index of the low-refractive index layer 43A is preferably 1.20 to 1.60, and more preferably 1.30 to 1.50.

The refractive index of the high-refractive index layer 43B is preferably 2.00 to 2.60, more preferably 2.10 to 2.45. The dielectrics with such a high refractive index may include niobium pentoxide ($Nb_2O_5$, refractive index 2.33), titanium oxide ($TiO_2$, refractive index 2.33 to 2.55), tungsten oxide ($WO_3$, refractive index 2.2), cerium oxide ($CeO_2$, refractive index 2.2), tantalum pentoxide ($Ta_2O_5$, refractive index 2.16), Zinc oxide (ZnO, refractive index 2.1), and indium tin oxide (ITO, refractive index 2.06).

The anti-reflection layer 43 can be formed as a high-density film by utilizing the same deposition method as the dielectric layer 42B described above. Ion beam-assisted deposition (IAD) or ion beam sputtering (IBS) is the preferred method because it can produce higher-density films.

Protective Film

The surfaces of the plurality of convex portions 42 and the surface 43a of the anti-reflection layer 43 are covered with protective films 44A and 44B made of dielectric material, respectively. The protective film 44A covers the tops of the convex portions 42 and the sides of the convex portions 42 and may cover the surface of the transparent substrate 41 between the convex portions 42, if necessary. Covering by the protective film 44A and the protective film 44B can improve the durability of the polarizer.

The protective films 44A and 44B are preferably formed by the ALD method, which is capable of forming dense and uniform films and has an excellent film thickness controllability. As with the dielectric layer 42B described above, the protective films 44A and 44B may be composed of two or more layers of different constituent materials.

The protective film 40A may completely fill the space between the convex portions 42. In this case, the SOG (spin on glass) method can be used in addition to the method of forming the dielectric layer 42B described above. The SOG can planarize the film without creating an air layer.

The protective films 44A and 44B may be formed with the same dielectric as the first dielectric forming the dielectric film 22. From the viewpoint of heat resistance, $Al_2O_3$ is particularly preferred.

The thickness of at least one of the protective films 44A and 44B may be 2.5 nm or less, and from the viewpoint of maintaining durability, the thickness is preferably 1 nm or more, more preferably 1.5 nm or more, and further preferably 2.0 nm or more. With a thickness in this range, it is also possible to improve the light transmission properties and, in particular, to avoid a large degradation of the optical properties, while maintaining the durability of the polarizer.

The thickness of at least one of the protective films 44A and 44B may be 2.5 nm or more, and from the viewpoint of improving the light transmission property, the thickness is preferably 10 nm or less, more preferably 7.5 nm or less, and further preferably 5.0 nm or less. With a thickness in this range, it is possible to improve light transmission properties and, in particular, to maintain high heat resistance, while maintaining the durability of the polarizer.

Water-Repellent Film

In addition, at least one of the protective film 44A and the protective film 44B of the polarizer 40 may be covered with an organic water-repellent film. The organic water-repellent film may be composed of fluorinated silane compounds such as perfluorodecyltriethoxysilane (FDTS) and can be formed by using the CVD or ALD methods described above. This can improve the reliability of the polarizer, such as moisture resistance.

Liquid Crystal Projector

The optical device 10 described above can be suitably used in applications requiring heat resistance, such as, e.g., liquid crystal projectors and head-up displays. A liquid crystal projector is explained below as a specific example.

Figure 7:
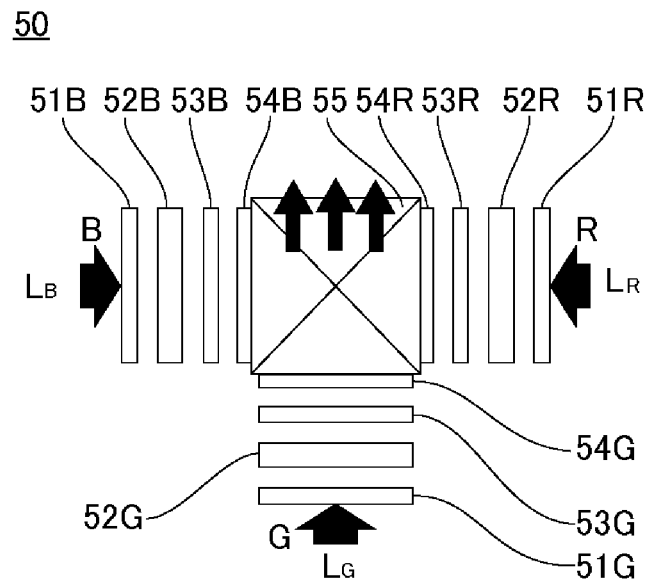
FIG. 7 is a top view schematically illustrating a part of the optical unit of a liquid crystal projector.

FIG. 7 is a top view schematically illustrating a part of the optical unit of a transmissive 3LCD liquid crystal projector. The optical engine portion of the liquid crystal projector 50 includes: an incident-side polarizing element 51R, a liquid crystal panel 52R, an emission-side pre-polarizing element 53R, and an emission-side main polarizing element 54R for red light $L_R$; an incident-side polarizing element 51G, a liquid crystal panel 52G, an emission-side pre-polarizing element 53G, and an emission-side main polarizing element 54G for green light $L_G$; an incident-side polarizing element 51B, a liquid crystal panel 52B, an emission-side pre-polarizing element 53B, and an emission-side main polarizing element 54B for blue light $L_B$; and a cross dichroprism 55 that combines the light emitted from the respective emission-side main polarizing elements 54R, 54G, and 54B and emits the combined light to the projection lens. Here, the incident-side polarizing elements 51R, 51G, 51B, the liquid crystal panels 52R, 53G, 52B, the emission-side pre-polarizing elements 53R, 53G, 53B, and the emission-side main polarizing elements 54R, 54G, 54B respectively correspond to the incident-side polarizing element 12, the optical modulating element 13, the emission-side first polarizing element 14, and the emission-side second polarizing element 15 of the optical device 10 described above.

In the liquid crystal projector 50 according to the present technology, the red light $L_R$, the green light $L_G$, and the blue light $L_B$ are incident on the corresponding incident-side polarizing elements 51R, 51G, 51B, the light $L_R$, $L_G$, $L_B$ polarized by the incident-side polarizing elements 51R, 51G, 51B are spatially modulated by the respective liquid crystal panels 52R, 53G, 52B and emitted therefrom, and after passing through emission-side pre-polarizing elements 53R, 53G, 53B and emission-side main polarizing elements 54R, 54G, 54B, they are combined by cross dichroprism 55 and projected from the projection lens (not shown). The red light $L_R$, green light $L_G$, and blue light $L_B$ may be light emitted from the light source and separated by a dichroic mirror, but high output from a two-dimensional laser array light source corresponding to each color may be used because the present technology has excellent light resistance properties against strong light.

According to the optical device of the present technology, by optimizing the rotation angle (orthogonal offset angle) of the orthogonal axis of the emission-side first polarizing element 14 relative to the orthogonal axis of the incident-side polarizing element 12 and the rotation angle (orthogonal offset angle) of the orthogonal axis of the emission-side second polarizing element 15 relative to the orthogonal axis of the incident-side polarizing element 12, high P-polarization transmittance (Tp) and contrast ratio (CR) can be obtained in the whole band in the visible light region. Therefore, when projected by a projector, bright and clear image quality can be obtained.

It should be noted that although the present technology has been described based on the drawings and embodiments, the present technology is not limited only to the above embodiments, and those skilled in the art can easily make various variations or modifications based on this disclosure. Accordingly, it should be noted that these variations or modifications are included in the scope of the present technology. In addition, the drawings are schematic, and the proportions of each dimension may differ from the reality. Specific dimensions or the like should be determined by referring to the above description, and it is of course the case that there are parts where the relationship and ratio of dimensions differ even among the drawings.

EXAMPLES

2. First Examples

In the first examples, the angular dependence of the emission-side pre-polarizer and the emission-side main polarizer was measured. The technology is not limited to these examples, and variations and improvements are also included in the present technology to the extent that the technology is effective.

Emission-Side Pre-Polarizer

A polarizer was fabricated with the same configuration as the first configuration example shown in FIG. 3. The transparent substrate 21 was made of sapphire, the base-shaped portion 23 of $SiO_2$, and the protruding portion 24 of Ge. The base-shaped portion 23 had an approximately triangular shape in xz cross-section, and the protruding portion 24 had an approximately circular shape in cross-section, and the protruding portion 24 was in contact with the inclined surface 23a.

Emission-Side Main Polarizer

A polarizer was fabricated with the same configuration as the configuration example shown in FIG. 5. The transparent substrate 41 was made of glass, the reflection layer 42A of the convex portion 42 was made of Al, the dielectric layer 42B of $SiO_2$, and the absorption layer 42C of FeSi. The anti-reflection layer 43 was alternately stacked from the side closer to the transparent substrate 41: a first ($SiO_2$), a second layer ($TiO_2$), a third layer ($SiO_2$), a fourth layer ($TiO_2$), a fifth layer ($SiO_2$), a sixth layer ($TiO_2$), a seventh layer ($SiO_2$), an eighth ($TiO_2$), a ninth layer ($SiO_2$). The protective films 44A and 44B were composed of $Al_2O_3$.

Measurement of Optical Properties

Using the Hitachi U-4100 spectrophotometer as the measuring instrument, the optical properties were measured by rotating the polarizer sample; that is, the angular position where the S-polarization transmittance (Ts) was the lowest was set at 0°, and the angle was changed from there to measure the optical properties.

Optical Properties and Changes in Optical Properties of Emission-Side Pre-Polarizer Table 1 shows the optical properties and changes in optical properties of the emission-side pre-polarizers. While rotating the orthogonal axis of the emission-side pre-polarizer, the S-polarization transmittance (Ts) and the P-polarization transmittance (Tp) were measured and the contrast ratios (CR) were calculated for the whole band in the visible light region (red band: wavelength λ=600 to 680 nm, green band: wavelength λ=520 to 590 nm, blue band: wavelength λ=430 to 510 nm). In addition, the S-polarization transmittance (Ts), the P-polarization transmittance (Tp), and the change amount (%) from the contrast ratio (CR) at the 0° position were also calculated, respectively.

TABLE 1

| pre angle | optical property | | | | | | | | | change in optical property | | | | | | | | |
|---|---|---|---|---|---|---|---|---|---|---|---|---|---|---|---|---|---|---|
| | Bch | | | Gch | | | Rch | | | Bch | | | Gch | | | Rch | | |
| | Tp | Ts | CR | Tp | Ts | CR | Tp | Ts | CR | Tp | Ts | CR | Tp | Ts | CR | Tp | Ts | CR |
| −30 | 84.41 | 61.36 | 1.376 | 87.29 | 66.72 | 1.308 | 90.24 | 74.20 | 1.216 | −11.81 | 12.06 | −29.5% | −10.45 | 10.54 | −24.8% | −8.26 | 8.67 | −19.1% |
| −20 | 90.67 | 55.30 | 1.639 | 92.81 | 61.48 | 1.510 | 94.57 | 69.71 | 1.357 | −5.56 | 6.00 | −16.0% | −4.94 | 5.30 | −13.2% | −3.93 | 4.17 | −9.7% |
| −10 | 94.79 | 50.88 | 1.863 | 96.41 | 57.53 | 1.676 | 97.46 | 66.69 | 1.461 | −1.44 | 1.58 | −4.5% | −1.33 | 1.35 | −3.7% | −1.04 | 1.16 | −2.8% |
| −5 | 95.82 | 50.06 | 1.914 | 97.31 | 57.03 | 1.706 | 98.31 | 66.27 | 1.484 | −0.41 | 0.76 | −1.9% | −0.43 | 0.85 | −1.9% | −0.20 | 0.73 | −1.3% |
| −4 | 95.95 | 49.76 | 1.928 | 97.50 | 56.54 | 1.724 | 98.41 | 65.87 | 1.494 | −0.28 | 0.46 | −1.2% | −0.25 | 0.36 | −0.9% | −0.10 | 0.33 | −0.6% |
| −3 | 96.04 | 49.77 | 1.929 | 97.58 | 56.68 | 1.722 | 98.42 | 65.89 | 1.494 | −0.19 | 0.47 | −1.1% | −0.16 | 0.50 | −1.1% | −0.09 | 0.35 | −0.6% |
| −2 | 96.14 | 49.49 | 1.943 | 97.64 | 56.47 | 1.729 | 98.50 | 65.65 | 1.500 | −0.09 | 0.19 | −0.5% | −0.10 | 0.29 | −0.6% | 0.00 | 0.12 | −0.2% |
| −1 | 96.20 | 49.61 | 1.939 | 97.67 | 56.37 | 1.732 | 98.51 | 65.88 | 1.495 | −0.03 | 0.30 | −0.6% | −0.08 | 0.19 | −0.4% | 0.01 | 0.34 | −0.5% |
| 0 | 96.23 | 49.30 | 1.952 | 97.74 | 56.18 | 1.740 | 98.50 | 65.54 | 1.503 | 0.00 | 0.00 | 0.0% | 0.00 | 0.00 | 0.0% | 0.00 | 0.00 | 0.0% |
| 1 | 96.20 | 49.61 | 1.939 | 97.67 | 56.37 | 1.732 | 98.51 | 65.88 | 1.495 | −0.03 | 0.30 | −0.6% | −0.08 | 0.19 | −0.4% | 0.01 | 0.34 | −0.5% |

TABLE 1-continued

| | optical property | | | | | | | | | change in optical property | | | | | | | | |
|---|---|---|---|---|---|---|---|---|---|---|---|---|---|---|---|---|---|---|
| pre | Bch | | | Gch | | | Rch | | | Bch | | | Gch | | | Rch | | |
| angle | Tp | Ts | CR | Tp | Ts | CR | Tp | Ts | CR | Tp | Ts | CR | Tp | Ts | CR | Tp | Ts | CR |
| 2 | 96.14 | 49.49 | 1.943 | 97.64 | 56.47 | 1.729 | 98.50 | 65.65 | 1.500 | −0.09 | 0.19 | −0.5% | −0.10 | 0.29 | −0.6% | 0.00 | 0.12 | −0.2% |
| 3 | 96.04 | 49.77 | 1.929 | 97.58 | 56.68 | 1.722 | 98.42 | 65.89 | 1.494 | −0.19 | 0.47 | −1.1% | −0.16 | 0.50 | −1.1% | −0.09 | 0.35 | −0.6% |
| 4 | 95.95 | 49.76 | 1.928 | 97.50 | 56.54 | 1.724 | 98.41 | 65.87 | 1.494 | −0.28 | 0.46 | −1.2% | −0.25 | 0.36 | −0.9% | −0.10 | 0.33 | −0.6% |
| 5 | 95.82 | 50.06 | 1.914 | 97.31 | 57.03 | 1.706 | 98.31 | 66.27 | 1.484 | −0.41 | 0.76 | −1.9% | −0.43 | 0.85 | −1.9% | −0.20 | 0.73 | −1.3% |
| 10 | 94.79 | 50.88 | 1.863 | 96.41 | 57.53 | 1.676 | 97.46 | 66.69 | 1.461 | −1.44 | 1.58 | −4.5% | −1.33 | 1.35 | −3.7% | −1.04 | 1.16 | −2.8% |
| 20 | 90.67 | 55.30 | 1.639 | 92.81 | 61.48 | 1.510 | 94.57 | 69.71 | 1.357 | −5.56 | 6.00 | −16.0% | −4.94 | 5.30 | −13.2% | −3.93 | 4.17 | −9.7% |
| 30 | 84.41 | 61.36 | 1.376 | 87.29 | 66.72 | 1.308 | 90.24 | 74.20 | 1.216 | −11.81 | 12.06 | −29.5% | −10.45 | 10.54 | −24.8% | −8.26 | 8.67 | −19.1% |

Figure 8:
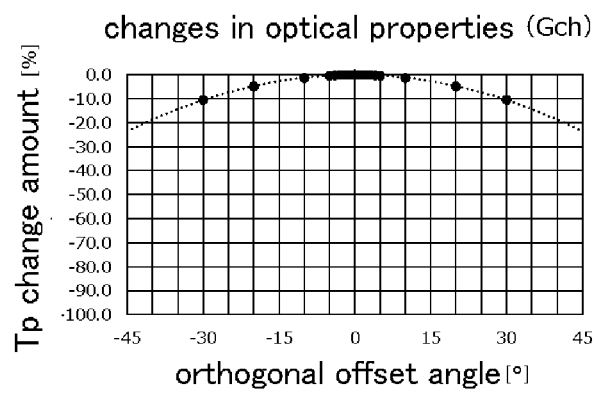
FIG. 8 is a graph showing the change amount in P-polarization transmittance (Tp) in the green band of the emission-side pre-polarizer.
Figure 9:
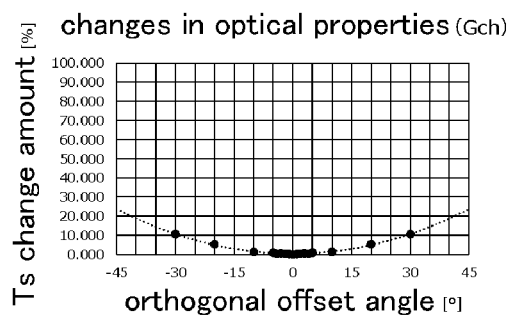
FIG. 9 is a graph showing the change amount in S-polarization transmittance (Ts) in the green band of the emission-side pre-polarizer.
Figure 10:
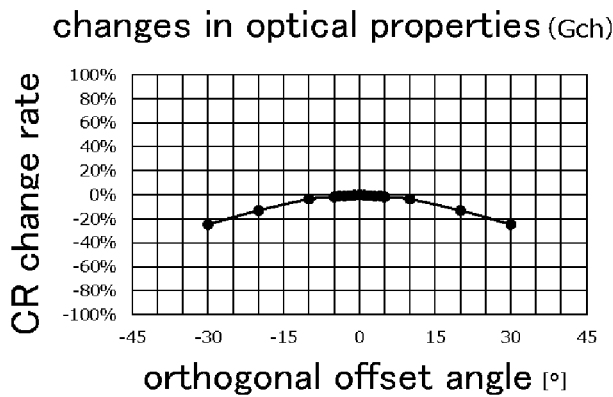
FIG. 10 is a graph showing the change amount in contrast ratio (CR) in the green band of the emission-side pre-polarizer.
Figure 11:
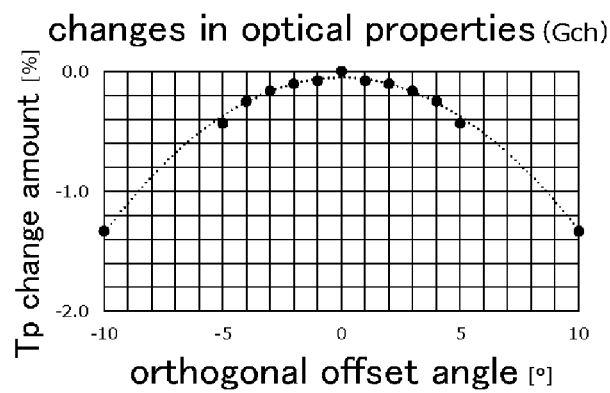
FIG. 11 is a graph showing the range of orthogonal offset angle of ±100 in the change amount in P-polarization transmittance (Tp) shown in FIG. 8.

FIG. 8 is a graph showing the change amount in P-polarization transmittance (Tp) in the green band of the emission-side pre-polarizer, FIG. 9 is a graph showing the change amount in S-polarization transmittance (Ts) in the green band of the emission-side pre-polarizer, FIG. 10 is a graph showing the change amount in contrast ratio (CR) in the green band of the emission-side pre-polarizer, and FIG. 11 is a graph showing the range of orthogonal offset angle of ±100 in the change amount in P-polarization transmittance (Tp) shown in FIG. 8.

As shown in Table 1 and FIGS. 8 to 11, the emission-side pre-polarizers had P-polarization transmittance (Tp) of 90% or more for the whole band in the visible light region in the range of orthogonal offset angle of 20°. When the orthogonal offset angle of the emission-side pre-polarizer is ±8.5°, the change amount in the P-polarization transmittance (Tp) of the blue, green, and red bands is 95.1%, 96.7%, and 97.7%, respectively, and the change amount in the P-polarization transmittance (Tp) of the blue, green, and red bands from the 0° position is −1.1%, −1.1%, and −0.8%, respectively. The contrast ratio (CR) of the emission-side pre-polarizer was 2.0 or less, and when the orthogonal offset angle of the emission-side pre-polarizer was ±8.5°, the change amount in contrast ratio (CR) from the 0° position was −5% or less in the whole band in the visible light region, and even when the orthogonal offset angle of the emission-side pre-polarizer was ±20°, the change amount in contrast ratio (CR) from the 0° position was −20% or less in the whole band in the visible light region.

Optical Properties and Changes in Optical Properties of Emission-Side Main Polarizer Table 2 shows the optical properties and changes in optical properties of the emission-side main polarizers. While rotating the orthogonal axis of the emission-side main polarizer, the S-polarization transmittance (Ts) and the P-polarization transmittance (Tp) were measured and the contrast ratios (CR) were calculated for the whole band in the visible light region (red band: wavelength λ=600 to 680 nm, green band: wavelength λ=520 to 590 nm, blue band: wavelength λ=430 to 510 nm). In addition, the S-polarization transmittance (Ts), the P-polarization transmittance (Tp), and the change amount (%) from the contrast ratio (CR) at the 0° position were calculated, respectively.

TABLE 2

| | optical propety | | | | | | | | | change in optical property | | | | | | | | |
|---|---|---|---|---|---|---|---|---|---|---|---|---|---|---|---|---|---|---|
| main | Bch | | | Gch | | | Rch | | | Bch | | | Gch | | | Rch | | |
| angle | Tp | Ts | CR | Tp | Ts | CR | Tp | Ts | CR | Tp | Ts | CR | Tp | Ts | CR | Tp | Ts | CR |
| −30 | 68.39 | 22.96 | 3 | 70.25 | 23.54 | 3 | 69.89 | 23.43 | 3 | −22.94 | 22.89 | −99.8% | −23.61 | 23.48 | −99.8% | −23.47 | 23.37 | −99.8% |
| −20 | 80.51 | 10.75 | 7 | 82.74 | 11.03 | 8 | 82.24 | 10.95 | 8 | −10.82 | 10.68 | −99.4% | −11.12 | 10.97 | −99.5% | −11.13 | 10.90 | −99.5% |
| −10 | 88.50 | 2.85 | 31 | 90.93 | 2.91 | 31 | 90.44 | 2.89 | 31 | −2.82 | 2.78 | −97.7% | −2.92 | 2.85 | −98.0% | −2.93 | 2.84 | −98.1% |
| −5 | 90.61 | 0.76 | 119 | 93.09 | 0.78 | 120 | 92.60 | 0.77 | 121 | −0.72 | 0.70 | −91.0% | −0.76 | 0.71 | −92.2% | −0.77 | 0.71 | −92.7% |
| −4 | 90.85 | 0.51 | 178 | 93.38 | 0.52 | 181 | 92.81 | 0.51 | 181 | −0.48 | 0.44 | −86.6% | −0.48 | 0.46 | −88.2% | −0.56 | 0.46 | −89.0% |
| −3 | 91.06 | 0.32 | 283 | 93.55 | 0.32 | 292 | 93.07 | 0.31 | 296 | −0.27 | 0.25 | −78.6% | −0.31 | 0.26 | −81.0% | −0.29 | 0.26 | −82.1% |
| −2 | 91.18 | 0.18 | 502 | 93.70 | 0.18 | 526 | 93.18 | 0.17 | 540 | −0.14 | 0.11 | −62.1% | −0.16 | 0.12 | −65.6% | −0.18 | 0.12 | −67.3% |
| −1 | 91.27 | 0.10 | 934 | 93.79 | 0.09 | 1019 | 93.32 | 0.09 | 1075 | −0.06 | 0.03 | −29.5% | −0.07 | 0.03 | −33.5% | −0.05 | 0.03 | −34.8% |
| −0.8 | 91.29 | 0.09 | 1049 | 93.82 | 0.08 | 1152 | 93.36 | 0.08 | 1225 | −0.04 | 0.02 | −20.8% | −0.04 | 0.02 | −24.8% | −0.01 | 0.02 | −25.8% |
| −0.6 | 91.30 | 0.08 | 1145 | 93.80 | 0.07 | 1289 | 93.36 | 0.07 | 1373 | −0.03 | 0.01 | −13.6% | −0.05 | 0.01 | −15.8% | 0.00 | 0.01 | −16.8% |
| −0.4 | 91.30 | 0.07 | 1242 | 93.82 | 0.07 | 1398 | 93.27 | 0.06 | 1507 | −0.02 | 0.00 | −6.3% | −0.04 | 0.01 | −8.7% | −0.10 | 0.01 | −8.7% |
| −0.2 | 91.32 | 0.07 | 1296 | 93.88 | 0.06 | 1488 | 93.29 | 0.06 | 1598 | −0.01 | 0.00 | −2.2% | 0.02 | 0.00 | −2.9% | −0.08 | 0.00 | −3.2% |
| 0 | 91.33 | 0.07 | 1325 | 93.86 | 0.06 | 1532 | 93.36 | 0.06 | 1650 | 0.00 | 0.00 | 0.0% | 0.00 | 0.00 | 0.0% | 0.00 | 0.00 | 0.0% |
| 0.2 | 91.32 | 0.07 | 1296 | 93.88 | 0.06 | 1488 | 93.29 | 0.06 | 1598 | −0.01 | 0.00 | −2.2% | 0.02 | 0.00 | −2.9% | −0.08 | 0.00 | −3.2% |
| 0.4 | 91.30 | 0.07 | 1242 | 93.82 | 0.07 | 1398 | 93.27 | 0.06 | 1507 | −0.02 | 0.00 | −6.3% | −0.04 | 0.01 | −8.7% | −0.10 | 0.01 | −8.7% |
| 0.6 | 91.30 | 0.08 | 1145 | 93.80 | 0.07 | 1289 | 93.36 | 0.07 | 1373 | −0.03 | 0.01 | −13.6% | −0.05 | 0.01 | −15.8% | 0.00 | 0.01 | −16.8% |
| 0.8 | 91.29 | 0.09 | 1049 | 93.82 | 0.08 | 1152 | 93.36 | 0.08 | 1225 | −0.04 | 0.02 | −20.8% | −0.04 | 0.02 | −24.8% | −0.01 | 0.02 | −25.8% |
| 1 | 91.27 | 0.10 | 934 | 93.79 | 0.09 | 1019 | 93.32 | 0.09 | 1075 | −0.06 | 0.03 | −29.5% | −0.07 | 0.03 | −33.5% | −0.05 | 0.03 | −34.8% |
| 2 | 91.18 | 0.18 | 502 | 93.70 | 0.18 | 526 | 93.18 | 0.17 | 540 | −0.14 | 0.11 | −62.1% | −0.16 | 0.12 | −65.6% | −0.18 | 0.12 | −67.3% |
| 3 | 91.06 | 0.32 | 283 | 93.55 | 0.32 | 292 | 93.07 | 0.31 | 296 | −0.27 | 0.25 | −78.6% | −0.31 | 0.26 | −81.0% | −0.29 | 0.26 | −82.1% |
| 4 | 90.85 | 0.51 | 178 | 93.38 | 0.52 | 181 | 92.81 | 0.51 | 181 | −0.48 | 0.44 | −86.6% | −0.48 | 0.46 | −88.2% | −0.56 | 0.46 | −89.0% |
| 5 | 90.61 | 0.76 | 119 | 93.09 | 0.78 | 120 | 92.60 | 0.77 | 121 | −0.72 | 0.70 | −91.0% | −0.76 | 0.71 | −92.2% | −0.77 | 0.71 | −92.7% |
| 10 | 88.50 | 2.85 | 31 | 90.93 | 2.91 | 31 | 90.44 | 2.89 | 31 | −2.82 | 2.78 | −97.7% | −2.92 | 2.85 | −98.0% | −2.93 | 2.84 | −98.1% |
| 20 | 80.51 | 10.75 | 7 | 82.74 | 11.03 | 8 | 82.24 | 10.95 | 8 | −10.82 | 10.68 | −99.4% | −11.12 | 10.97 | −99.5% | −11.13 | 10.90 | −99.5% |
| 30 | 68.39 | 22.96 | 3 | 70.25 | 23.54 | 3 | 69.89 | 23.43 | 3 | −22.94 | 22.89 | −99.8% | −23.61 | 23.48 | −99.8% | −23.47 | 23.37 | −99.8% |

Figure 12:
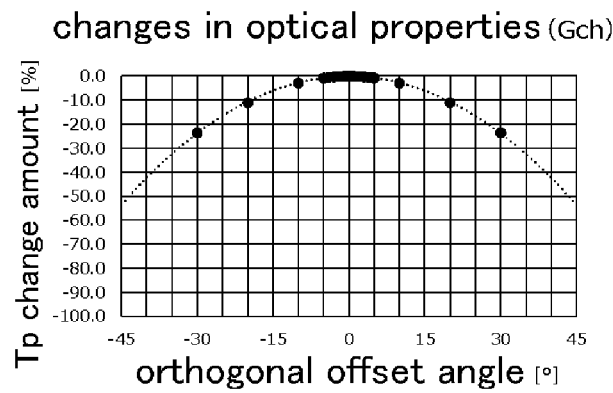
FIG. 12 is a graph showing the change amount in P-polarization transmittance (Tp) in the green band of the emission-side main polarizer.
Figure 13:
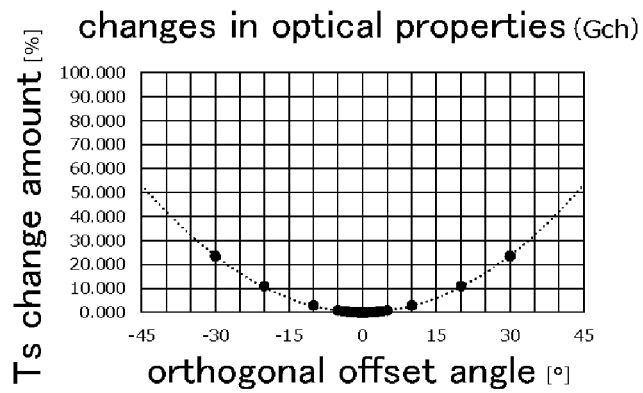
FIG. 13 is a graph showing the change amount in S-polarization transmittance (Ts) in the green band of the emission-side main polarizer.
Figure 14:
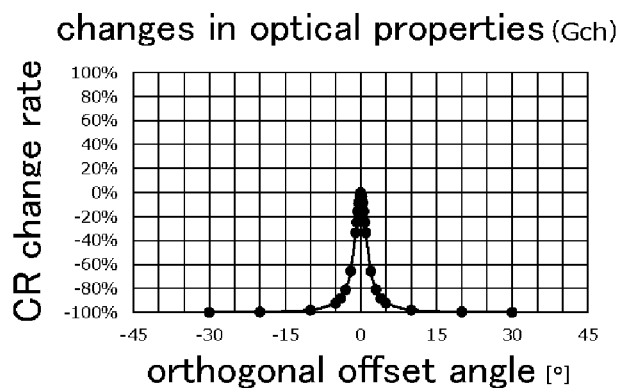
FIG. 14 is a graph showing the change amount in contrast ratio (CR) in the green band of the emission-side main polarizer.
Figure 15:
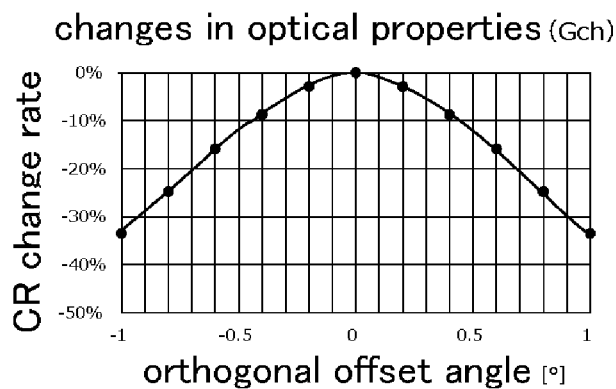
FIG. 15 is a graph showing the range of orthogonal offset angle of ±1° in the change amount in contrast ratio (CR) shown in FIG. 14.

FIG. 12 is a graph showing the change amount in P-polarization transmittance (Tp) in the green band of the emission-side main polarizer, FIG. 13 is a graph showing the change amount in S-polarization transmittance (Ts) in the green band of the emission-side main polarizer, FIG. 14 is a graph showing the change amount in contrast ratio (CR) in the green band of the emission-side main polarizer, and FIG. 15 is a graph showing the range of orthogonal offset angle of ±1° in the change amount in contrast ratio (CR) shown in FIG. 14.

As shown in Table 2 and FIGS. 12 to 15, the emission-side main polarizer had P-polarization transmittance (Tp) of 90% or more for the whole band in the visible light region in the range of orthogonal offset angle of ±0.7°. When the orthogonal offset angle of the emission-side main polarizer was ±0.7°, the change amount in P-polarization transmittance (Tp) from the 0° position was −1% or less for the whole band in the visible light region. The emission-side main polarizer had a contrast ratio (CR) of 1,000 or more for the whole band in the visible light region in the orthogonal offset angle range of ±0.7°. When the orthogonal offset angle of the emission-side main polarizer was ±0.7°, the change amount in contrast ratio (CR) from the 0° position was −20% or less for the whole band in the visible light region.

Optical Properties and Changes in Optical Properties of Emission-Side Pre-Polarizer (0 to 30°) and Emission-Side Main Polarizer (0 to 30°)

Table 3 shows the optical properties and changes in optical properties when the orthogonal axes of the emission-side pre-polarizer and the emission-side main polarizer are rotated simultaneously. From the optical properties of the emission-side pre-polarizer shown in Table 2 and the optical properties of the emission-side main polarizer shown in Table 3, the S-polarization transmittance (Ts), the P-polarization transmittance (Tp), and the contrast ratio (CR) were calculated for the whole band in the visible light region (red band: wavelength λ=600 to 680 nm, green band: wavelength λ=520 to 590 nm, blue band: wavelength λ=430 to 510 nm). The change amount (%) from the S-polarization transmittance (Ts), the P-polarization transmittance (Tp), and the contrast ratio (CR) at the 0° position of the orthogonal axis of the emission-side pre-polarizer and the emission-side main polarizer were calculated, respectively.

TABLE 3

| pre + main angle | optical property | | | | | | | | | change in optical property | | |
|---|---|---|---|---|---|---|---|---|---|---|---|---|
| | Bch | | | Gch | | | Rch | | | Bch | | |
| | Tp | Ts | CR | Tp | Ts | CR | Tp | Ts | CR | Tp | Ts | CR |
| −30 | 57.73 | 14.090 | 4 | 61.32 | 15.706 | 4 | 63.07 | 17.384 | 4 | −30.15 | 14.056 | −99.8% |
| −20 | 72.99 | 5.947 | 12 | 76.79 | 6.779 | 11 | 77.77 | 7.636 | 10 | −14.89 | 5.913 | −99.5% |
| −10 | 83.89 | 1.450 | 58 | 87.67 | 1.675 | 52 | 88.14 | 1.930 | 46 | −3.99 | 1.416 | −97.8% |
| −5 | 86.82 | 0.382 | 227 | 90.59 | 0.443 | 205 | 91.03 | 0.508 | 179 | −1.06 | 0.348 | −91.2% |
| −4 | 87.17 | 0.254 | 343 | 91.04 | 0.292 | 312 | 91.33 | 0.337 | 271 | −0.71 | 0.220 | −86.7% |
| −3 | 87.45 | 0.160 | 546 | 91.29 | 0.182 | 502 | 91.60 | 0.208 | 441 | −0.43 | 0.126 | −78.9% |
| −2 | 87.66 | 0.090 | 975 | 91.49 | 0.101 | 910 | 91.78 | 0.113 | 810 | −0.22 | 0.056 | −62.3% |
| −1 | 87.80 | 0.048 | 1811 | 91.60 | 0.052 | 1765 | 91.93 | 0.057 | 1608 | −0.08 | 0.015 | −30.0% |
| 0 | 87.88 | 0.034 | 2586 | 91.74 | 0.034 | 2665 | 91.97 | 0.037 | 2481 | 0.00 | 0.000 | 0.0% |
| 1 | 87.80 | 0.048 | 1811 | 91.60 | 0.052 | 1765 | 91.93 | 0.057 | 1608 | −0.08 | 0.015 | −30.0% |
| 2 | 87.66 | 0.090 | 975 | 91.49 | 0.101 | 910 | 91.78 | 0.113 | 810 | −0.22 | 0.056 | −62.3% |
| 3 | 87.45 | 0.160 | 546 | 91.29 | 0.182 | 502 | 91.60 | 0.208 | 441 | −0.43 | 0.126 | −78.9% |
| 4 | 87.17 | 0.254 | 343 | 91.04 | 0.292 | 312 | 91.33 | 0.337 | 271 | −0.71 | 0.220 | −86.7% |
| 5 | 86.82 | 0.382 | 227 | 90.59 | 0.443 | 205 | 91.03 | 0.508 | 179 | −1.06 | 0.348 | −91.2% |
| 10 | 83.89 | 1.450 | 58 | 87.67 | 1.675 | 52 | 88.14 | 1.930 | 46 | −3.99 | 1.416 | −97.8% |
| 20 | 72.99 | 5.947 | 12 | 76.79 | 6.779 | 11 | 77.77 | 7.636 | 10 | −14.89 | 5.913 | −99.5% |
| 30 | 57.73 | 14.090 | 4 | 61.32 | 15.706 | 4 | 63.07 | 17.384 | 4 | −30.15 | 14.056 | −99.8% |

| pre + main angle | change in optical property | | | | | |
|---|---|---|---|---|---|---|
| | Gch | | | Rch | | |
| | Tp | Ts | CR | Tp | Ts | CR |
| −30 | −30.42 | 15.672 | −99.9% | −28.90 | 17.347 | −99.9% |
| −20 | −14.95 | 6.745 | −99.6% | −14.20 | 7.599 | −99.6% |
| −10 | −4.07 | 1.641 | −98.0% | −3.82 | 1.893 | −98.2% |
| −5 | −1.15 | 0.408 | −92.3% | −0.94 | 0.471 | −92.8% |
| −4 | −0.70 | 0.258 | −88.3% | −0.64 | 0.300 | −89.1% |
| −3 | −0.45 | 0.147 | −81.2% | −0.37 | 0.170 | −82.2% |
| −2 | −0.25 | 0.066 | −65.9% | −0.18 | 0.076 | −67.4% |
| −1 | −0.15 | 0.017 | −33.8% | −0.03 | 0.020 | −35.2% |
| 0 | 0.00 | 0.000 | 0.0% | 0.00 | 0.000 | 0.0% |
| 1 | −0.15 | 0.017 | −33.8% | −0.03 | 0.020 | −35.2% |
| 2 | −0.25 | 0.066 | −65.9% | −0.18 | 0.076 | −67.4% |
| 3 | −0.45 | 0.147 | −81.2% | −0.37 | 0.170 | −82.2% |
| 4 | −0.70 | 0.258 | −88.3% | −0.64 | 0.300 | −89.1% |
| 5 | −1.15 | 0.408 | −92.3% | −0.94 | 0.471 | −92.8% |
| 10 | −4.07 | 1.641 | −98.0% | −3.82 | 1.893 | −98.2% |
| 20 | −14.95 | 6.745 | −99.6% | −14.20 | 7.599 | −99.6% |
| 30 | −30.42 | 15.672 | −99.9% | −28.90 | 17.347 | −99.9% |

Figure 16:
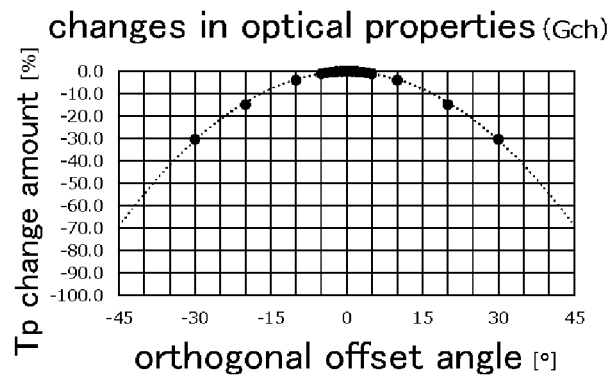
FIG. 16 is a graph showing the change amount in P-polarization transmittance (Tp) in the green band for the emission-side pre-polarizer (0 to 30°) and the emission-side main polarizer (0 to 30°).
Figure 17:
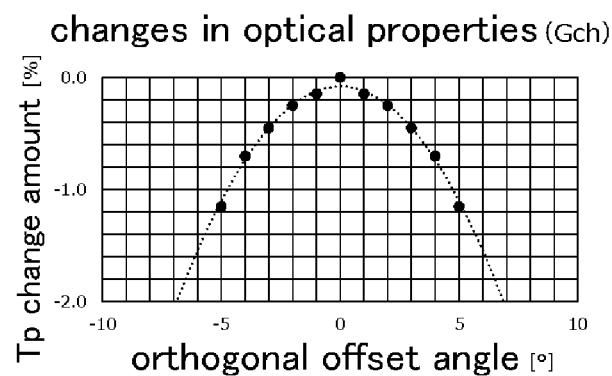
FIG. 17 is a graph showing the range of orthogonal offset angle of ±100 in the change amount in P-polarization transmittance (Tp) shown in FIG. 16.
Figure 18:
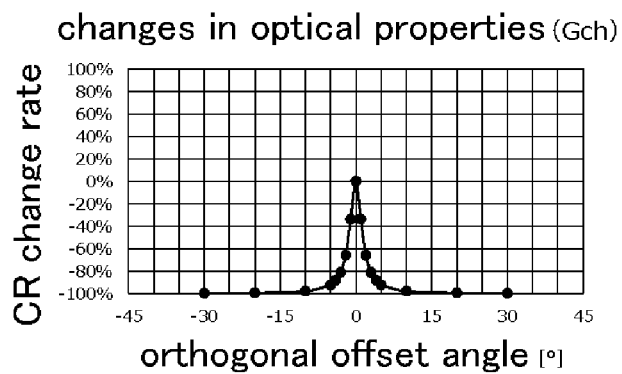
FIG. 18 is a graph showing the change amount in contrast ratio (CR) in the green band for the emission-side pre-polarizer (0 to 30°) and the emission-side main polarizer (0 to 30°).
Figure 19:
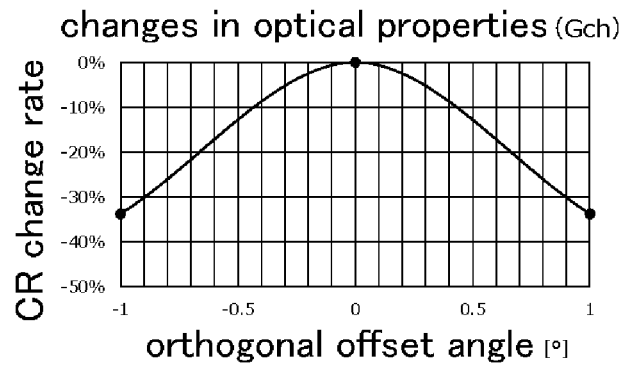
FIG. 19 is a graph showing the range of orthogonal offset angle of ±1° in the change amount in contrast ratio (CR) shown in FIG. 18.

FIG. 16 is a graph showing the change amount in P-polarization transmittance (Tp) in the green band for the emission-side pre-polarizer (0 to 30°) and the emission-side main polarizer (0 to 30°), FIG. 17 is a graph showing the range of orthogonal offset angle of ±10° in the change amount in P-polarization transmittance (Tp) shown in FIG. 16, FIG. 18 is a graph showing the change amount in contrast ratio (CR) in the green band for the emission-side pre-polarizer (0 to 30°) and the emission-side main polarizer (0 to 30°), and FIG. 19 is a graph showing the range of orthogonal offset angle of ±1° in the change amount in contrast ratio (CR) shown in FIG. 18.

As shown in Table 3 and FIGS. 16 to 19, when the orthogonal offset angle of the emission-side pre-polarizer and emission-side main polarizer is 0°, the P-polarization transmittance (Tp) in the blue, green, and red bands is 87.9%, 91.7%, and 92.0%, respectively. When the orthogonal offset angle was ±0.7°, the change amount in contrast ratio (CR) from the 0° position was about −20% in the whole band in the visible light region.

Optical Properties and Changes in Optical Properties of Emission-Side Pre-Polarizers (0°) and Emission-Side Main Polarizers (0 to 30°

Table 4 shows the optical properties and changes in optical properties when the orthogonal axis of the emission-side pre-polarizer is placed at 0° position and the orthogonal axis of the emission-side main polarizer is rotated. From the optical properties of the emission-side pre-polarizer shown in Table 2 and the optical properties of the emission-side main polarizer shown in Table 3, the S-polarization transmittance (Ts), the P-polarization transmittance (Tp), and the contrast ratio (CR) were calculated for the whole band in the visible light region (red band: wavelength $\lambda$=600 to 680 nm, green band: wavelength $\lambda$=520 to 590 nm, blue band: wavelength $\lambda$=430 to 510 nm). The change amount (%) from the S-polarization transmittance (Ts), the P-polarization transmittance (Tp), and the contrast ratio (CR) at the 0° position of the orthogonal axis of the emission-side pre-polarizer and the emission-side main polarizer were calculated, respectively.

TABLE 4

| | optical property | | | | | | | | | change in optical property | | |
|---|---|---|---|---|---|---|---|---|---|---|---|---|
| main | Bch | | | Gch | | | Rch | | | Bch | | |
| angle | Tp | Ts | CR | Tp | Ts | CR | Tp | Ts | CR | Tp | Ts | CR |
| −30 | 65.81 | 11.321 | 6 | 68.66 | 13.224 | 5 | 68.84 | 15.354 | 4 | −22.07 | 11.287 | −99.8% |
| −20 | 77.47 | 5.302 | 15 | 80.88 | 6.195 | 13 | 81.00 | 7.179 | 11 | −10.41 | 5.268 | −99.4% |
| −10 | 85.16 | 1.405 | 61 | 88.88 | 1.636 | 54 | 89.08 | 1.896 | 47 | −2.72 | 1.371 | −97.7% |
| −5 | 87.19 | 0.377 | 231 | 90.99 | 0.436 | 209 | 91.21 | 0.502 | 182 | −0.69 | 0.343 | −91.0% |
| −4 | 87.42 | 0.252 | 347 | 91.27 | 0.290 | 314 | 91.42 | 0.335 | 273 | −0.46 | 0.218 | −86.6% |
| −3 | 87.62 | 0.158 | 553 | 91.44 | 0.180 | 508 | 91.68 | 0.206 | 444 | −0.26 | 0.125 | −78.6% |
| −2 | 87.74 | 0.090 | 980 | 91.59 | 0.100 | 916 | 91.79 | 0.113 | 811 | −0.14 | 0.056 | −62.1% |
| −1 | 87.82 | 0.048 | 1822 | 91.67 | 0.052 | 1773 | 91.92 | 0.057 | 1616 | −0.06 | 0.014 | −29.5% |
| 0 | 87.88 | 0.034 | 2586 | 91.74 | 0.034 | 2665 | 91.97 | 0.037 | 2481 | 0.00 | 0.000 | 0.0% |
| 1 | 87.82 | 0.048 | 1822 | 91.67 | 0.052 | 1773 | 91.92 | 0.057 | 1616 | −0.06 | 0.014 | −29.5% |
| 2 | 87.74 | 0.090 | 980 | 91.59 | 0.100 | 916 | 91.79 | 0.113 | 811 | −0.14 | 0.056 | −62.1% |
| 3 | 87.62 | 0.158 | 553 | 91.44 | 0.180 | 508 | 91.68 | 0.206 | 444 | −0.26 | 0.125 | −78.6% |
| 4 | 87.42 | 0.252 | 347 | 91.27 | 0.290 | 314 | 91.42 | 0.335 | 273 | −0.46 | 0.218 | −86.6% |
| 5 | 87.19 | 0.377 | 231 | 90.99 | 0.436 | 209 | 91.21 | 0.502 | 182 | −0.69 | 0.343 | −91.0% |
| 10 | 85.16 | 1.405 | 61 | 88.88 | 1.636 | 54 | 89.08 | 1.896 | 47 | −2.72 | 1.371 | −97.7% |
| 20 | 77.47 | 5.302 | 15 | 80.88 | 6.195 | 13 | 81.00 | 7.179 | 11 | −10.41 | 5.268 | −99.4% |
| 30 | 65.81 | 11.321 | 6 | 68.66 | 13.224 | 5 | 68.84 | 15.354 | 4 | −22.07 | 11.287 | −99.8% |

| | change in optical property | | | | | |
|---|---|---|---|---|---|---|
| main | Gch | | | Rch | | |
| angle | Tp | Ts | CR | Tp | Ts | CR |
| −30 | −23.08 | 13.190 | −99.8% | −23.12 | 15.317 | −99.8% |
| −20 | −10.86 | 6.161 | −99.5% | −10.96 | 7.142 | −99.5% |
| −10 | −2.86 | 1.602 | −98.0% | −2.88 | 1.859 | −98.1% |
| −5 | −0.75 | 0.402 | −92.2% | −0.76 | 0.465 | −92.7% |
| −4 | −0.47 | 0.256 | −88.2% | −0.55 | 0.298 | −89.0% |
| −3 | −0.30 | 0.146 | −81.0% | −0.29 | 0.169 | −82.1% |
| −2 | −0.15 | 0.066 | −65.6% | −0.18 | 0.076 | −67.3% |
| −1 | −0.07 | 0.017 | −33.5% | −0.04 | 0.020 | −34.8% |
| 0 | 0.00 | 0.000 | 0.0% | 0.00 | 0.000 | 0.0% |
| 1 | −0.07 | 0.017 | −33.5% | −0.04 | 0.020 | −34.8% |
| 2 | −0.15 | 0.066 | −65.6% | −0.18 | 0.076 | −67.3% |
| 3 | −0.30 | 0.146 | −81.0% | −0.29 | 0.169 | −82.1% |
| 4 | −0.47 | 0.256 | −88.2% | −0.55 | 0.298 | −89.0% |
| 5 | −0.75 | 0.402 | −92.2% | −0.76 | 0.465 | −92.7% |
| 10 | −2.86 | 1.602 | −98.0% | −2.88 | 1.859 | −98.1% |
| 20 | −10.86 | 6.161 | −99.5% | −10.96 | 7.142 | −99.5% |
| 30 | −23.08 | 13.190 | −99.8% | −23.12 | 15.317 | −99.8% |

Figure 20:
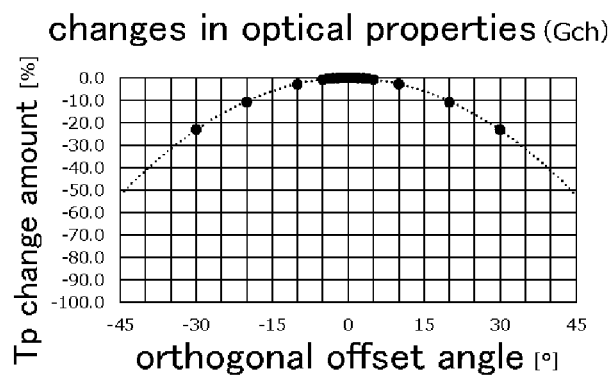
FIG. 20 is a graph showing the change amount in P-polarization transmittance (Tp) in the green band for the emission-side pre-polarizer (0°) and the emission-side main polarizer (0 to 30°).
Figure 21:
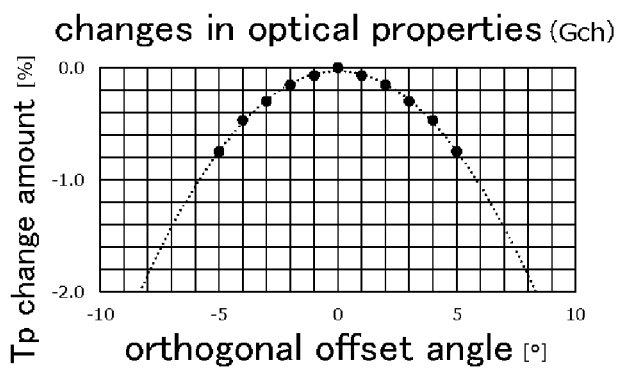
FIG. 21 is a graph showing the range of orthogonal offset angle of ±100 in the change amount in P-polarization transmittance (Tp) shown in FIG. 20.
Figure 22:
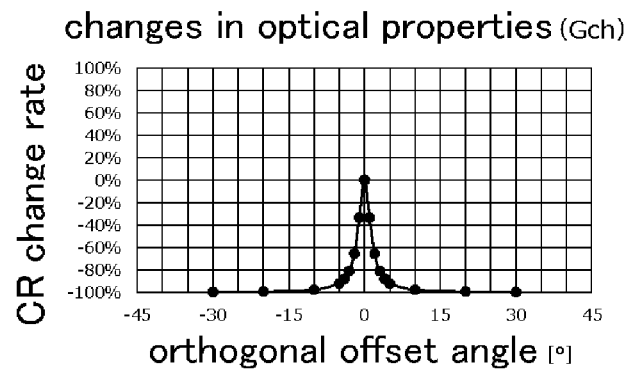
FIG. 22 is a graph showing the change amount in contrast ratio (CR) in the green band for the emission-side pre-polarizer (0°) and the emission-side main polarizer (0 to 30°).
Figure 23:
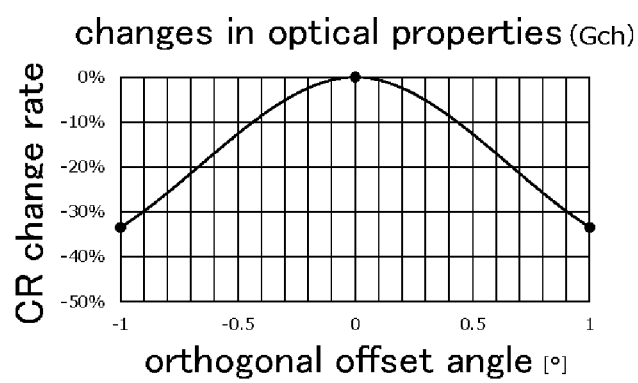
FIG. 23 is a graph showing the range of orthogonal offset angle of ±1° in the change amount in contrast ratio (CR) shown in FIG. 22.

FIG. 20 is a graph showing the change amount in P-polarization transmittance (Tp) in the green band for the emission-side pre-polarizer (0°) and the emission-side main polarizer (0 to 30°), FIG. 21 is a graph showing the range of orthogonal offset angle of ±10° in the change amount in P-polarization transmittance (Tp) shown in FIG. 20, FIG. 22 is a graph showing the change amount in contrast ratio (CR) in the green band for the emission-side pre-polarizer (0°) and the emission-side main polarizer (0 to 30°), and FIG. 23 is a graph showing the range of orthogonal offset angle of ±1° in the change amount in contrast ratio (CR) shown in FIG. 22.

As shown in Table 4 and FIGS. 20 to 23, when the orthogonal axis of the emission-side pre-polarizer is placed at the 0° position and the orthogonal offset angle of the emission-side main polarizer is ±0.7°, the change amount in p-polarization transmittance (Tp) from the 0° position of the orthogonal offset angle of the emission-side main polarizer was within −1 in the whole band in the visible light region, and the change amount in contrast ratio (CR) was about −20% in the whole band in the visible light region.

Optical Properties and Changes in Optical Properties of Emission-Side Pre-Polarizer (8.5°) and Emission-Side Main Polarizer (0 to 30°

Table 5 shows the optical properties and changes in optical properties when the orthogonal axis of the emission-side pre-polarizer is placed at 8.5° position and the orthogonal axis of the emission-side main polarizer is rotated. From the optical properties of the emission-side pre-polarizer shown in Table 2 and the optical properties of the emission-side main polarizer shown in Table 3, the S-polarization transmittance (Ts), the P-polarization transmittance (Tp), and the contrast ratio (CR) were calculated for the whole band in the visible light region (red band: wavelength λ=600 to 680 nm, green band: wavelength λ=520 to 590 nm, blue band: wavelength λ=430 to 510 nm). In addition, while placing the orthogonal axis of the emission-side pre-polarizer at 8.5° position, the change amount (%) from the S-polarization transmittance (Ts), the P-polarization transmittance (Tp), and the contrast ratio (CR) at the 0° position of the orthogonal axis of the emission-side main polarizer were calculated, respectively.

TABLE 5

| main angle | optical property | | | | | | | | | change in optical property | | |
|---|---|---|---|---|---|---|---|---|---|---|---|---|
| | Bch | | | Gch | | | Rch | | | Bch | | |
| | Tp | Ts | CR | Tp | Ts | CR | Tp | Ts | CR | Tp | Ts | CR |
| −30 | 65.04 | 11.627 | 6 | 67.92 | 13.507 | 5 | 68.29 | 15.595 | 4 | −21.81 | 11.592 | −99.8% |
| −20 | 76.56 | 5.445 | 14 | 80.00 | 6.327 | 13 | 80.36 | 7.292 | 11 | −10.29 | 5.410 | −99.4% |
| −10 | 84.16 | 1.443 | 58 | 87.92 | 1.671 | 53 | 88.37 | 1.926 | 46 | −2.69 | 1.408 | −97.7% |
| −5 | 86.17 | 0.387 | 223 | 90.00 | 0.445 | 202 | 90.48 | 0.510 | 177 | −0.68 | 0.352 | −91.0% |
| −4 | 86.39 | 0.259 | 334 | 90.28 | 0.297 | 304 | 90.69 | 0.341 | 266 | −0.45 | 0.224 | −86.6% |
| −3 | 86.59 | 0.163 | 532 | 90.45 | 0.184 | 492 | 90.94 | 0.210 | 434 | −0.26 | 0.128 | −78.6% |
| −2 | 86.71 | 0.092 | 943 | 90.59 | 0.102 | 887 | 91.05 | 0.115 | 792 | −0.13 | 0.057 | −62.1% |
| −1 | 86.79 | 0.049 | 1754 | 90.67 | 0.053 | 1717 | 91.19 | 0.058 | 1579 | −0.06 | 0.015 | −29.5% |
| 0 | 86.85 | 0.035 | 2489 | 90.74 | 0.035 | 2581 | 91.23 | 0.038 | 2423 | 0.00 | 0.000 | 0.0% |
| 1 | 86.79 | 0.049 | 1754 | 90.67 | 0.053 | 1717 | 91.19 | 0.058 | 1579 | −0.06 | 0.015 | −29.5% |
| 2 | 86.71 | 0.092 | 943 | 90.59 | 0.102 | 887 | 91.05 | 0.115 | 792 | −0.13 | 0.057 | −62.1% |
| 3 | 86.59 | 0.163 | 532 | 90.45 | 0.184 | 492 | 90.94 | 0.210 | 434 | −0.26 | 0.128 | −78.6% |
| 4 | 86.39 | 0.259 | 334 | 90.28 | 0.297 | 304 | 90.69 | 0.341 | 266 | −0.45 | 0.224 | −86.6% |
| 5 | 86.17 | 0.387 | 223 | 90.00 | 0.445 | 202 | 90.48 | 0.510 | 177 | −0.68 | 0.352 | −91.0% |
| 10 | 84.16 | 1.443 | 58 | 87.92 | 1.671 | 53 | 88.37 | 1.926 | 46 | −2.69 | 1.408 | −97.7% |
| 20 | 76.56 | 5.445 | 14 | 80.00 | 6.327 | 13 | 80.36 | 7.292 | 11 | −10.29 | 5.410 | −99.4% |
| 30 | 65.04 | 11.627 | 6 | 67.92 | 13.507 | 5 | 68.29 | 15.595 | 4 | −21.81 | 11.592 | −99.8% |

| main angle | change in optical property | | | | | |
|---|---|---|---|---|---|---|
| | Gch | | | Rch | | |
| | Tp | Ts | CR | Tp | Ts | CR |
| −30 | −22.83 | 13.471 | −99.8% | −22.94 | 15.557 | −99.8% |
| −20 | −10.75 | 6.292 | −99.5% | −10.87 | 7.254 | −99.5% |
| −10 | −2.83 | 1.636 | −98.0% | −2.86 | 1.888 | −98.1% |
| −5 | −0.74 | 0.410 | −92.2% | −0.75 | 0.472 | −92.7% |
| −4 | −0.46 | 0.261 | −88.2% | −0.54 | 0.303 | −89.0% |
| −3 | −0.30 | 0.149 | −81.0% | −0.29 | 0.172 | −82.1% |
| −2 | −0.15 | 0.067 | −65.6% | −0.18 | 0.077 | −67.3% |
| −1 | −0.07 | 0.018 | −33.5% | −0.04 | 0.020 | −34.8% |
| 0 | 0.00 | 0.000 | 0.0% | 0.00 | 0.000 | 0.0% |
| 1 | −0.07 | 0.018 | −33.5% | −0.04 | 0.020 | −34.8% |
| 2 | −0.15 | 0.067 | −65.6% | −0.18 | 0.077 | −67.3% |
| 3 | −0.30 | 0.149 | −81.0% | −0.29 | 0.172 | −82.1% |
| 4 | −0.46 | 0.261 | −88.2% | −0.54 | 0.303 | −89.0% |
| 5 | −0.74 | 0.410 | −92.2% | −0.75 | 0.472 | −92.7% |
| 10 | −2.83 | 1.636 | −98.0% | −2.86 | 1.888 | −98.1% |
| 20 | −10.75 | 6.292 | −99.5% | −10.87 | 7.254 | −99.5% |
| 30 | −22.83 | 13.471 | −99.8% | −22.94 | 15.557 | −99.8% |

Figure 24:
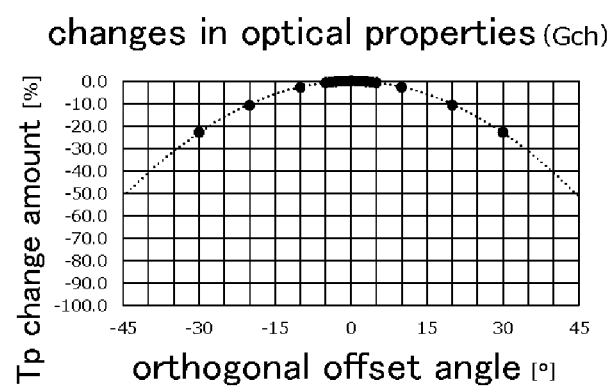
FIG. 24 is a graph showing the change amount in P-polarization transmittance (Tp) in the green band for the emission-side pre-polarizer (8.5°) and the emission-side main polarizer (0 to 30°).
Figure 25:
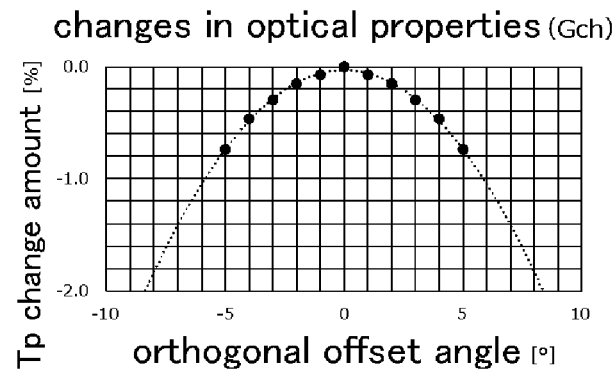
FIG. 25 is a graph showing the range of orthogonal offset angle of ±10° in the change amount in P-polarization transmittance (Tp) shown in FIG. 24.
Figure 26:
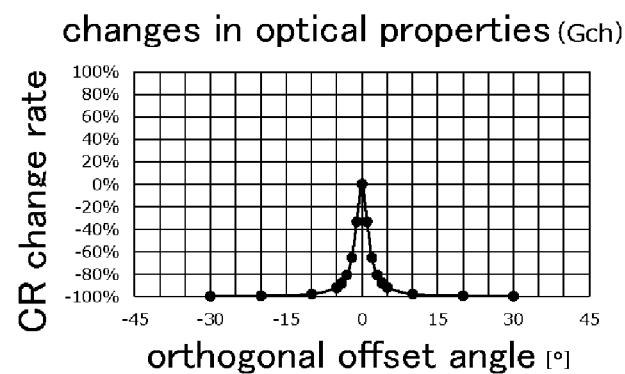
FIG. 26 is a graph showing the change amount in contrast ratio (CR) in the green band for the emission-side pre-polarizer (8.5°) and the emission-side main polarizer (0 to 30°).
Figure 27:
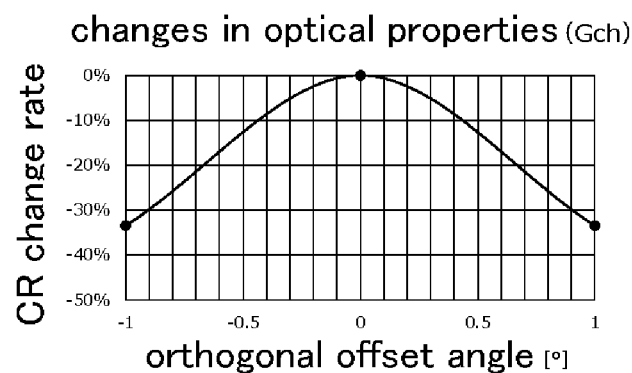
FIG. 27 is a graph showing the range of orthogonal offset angle of ±1° in the change amount in contrast ratio (CR) shown in FIG. 26.

FIG. 24 is a graph showing the change amount in P-polarization transmittance (Tp) in the green band for the emission-side pre-polarizer (8.5°) and the emission-side main polarizer (0 to 30°), FIG. 25 is a graph showing the range of orthogonal offset angle of ±10° in the change amount in P-polarization transmittance (Tp) shown in FIG. 24, FIG. 26 is a graph showing the change amount in contrast ratio (CR) in the green band for the emission-side pre-polarizer (8.5°) and the emission-side main polarizer (0 to 30°), and FIG. 27 is a graph showing the range of orthogonal offset angle of ±1° in the change amount in contrast ratio (CR) shown in FIG. 26.

As shown in Table 5 and FIGS. 24 to 27, when the orthogonal axis of the emission-side pre-polarizer is placed at 8.5° position and the orthogonal offset angle of the emission-side main polarizer is ±0°, the p-polarization transmittance (Tp) in the blue, green, and red bands is 86.9%, 90.7%, and 91.2%, respectively.

In addition, when the orthogonal axis of the emission-side pre-polarizer is placed at 8.5° position and the orthogonal offset angle of the emission-side main polarizer is ±0.7°, the change amount in P-polarization transmittance (Tp) from the 0° position of the orthogonal offset angle of the emission-side main polarizer was within −1% for the whole band in the visible light region, the change amount in contrast ratio (CR) was about −20% in the whole band in the visible light region.

According to the first example, by positioning the emission-side pre-polarizer at an orthogonal offset angle within 8.5° and the emission-side main polarizer at an orthogonal offset angle within ±0.7°, high P-polarization transmittance (Tp) and contrast ratio (CR) could be obtained in the whole band in the visible light region. Therefore, when projected by a projector, bright and clear image quality can be obtained.

3. First Experimental Example

In the first experimental example, the optical properties of the emission-side pre-polarizer were verified.

A simulation was performed to verify the effect of the emission-side pre-polarizer. More specifically, the optical properties of the polarizer were verified by electromagnetic field simulation using the Rigorous Coupled Wave Analysis (RCWA) method. The simulation was performed by using the grating simulator Gsolver available from Grating Solver Development.

Experimental Examples 1-1 to 1-4

The geometry of the polarizer in Experimental Example 1-1 is shown in FIG. 3, and the geometry of the polarizers in Experimental Examples 1-2 to 1-4 are shown in FIG. 4. In the polarizers in Experimental Examples 1-1 to 1-4, the transparent substrates 21, 31 and the base-shaped portions 23, 33 are both made of quartz, and the protruding portions 24, 34 are made of Ge. The base-shaped portions 23, 33 in Experimental Examples 1-1 to 1-4 all have a height a of 70 nm, a width b of 100 nm, a pitch P of 141 nm, and an inclination angle θ of 54°, 63°, 72°, and 81°, respectively. Since the height a and width b are fixed, the xz cross-section of Experimental Example 1-1 (θ=54°) is triangular, while the xz cross-section of Experimental Examples 1-2 (θ=63°), 1-3 (θ=72°), and 1-4 (θ=81°) is a trapezoidal shape. The shapes of the protruding portions 24 in Experimental Examples 1-1 to 1-4 all have circular cross sections and their radius is 15 nm. For the positions of the protruding portions 24, 34 in the base-shaped portions 23, 33, the outermost circumference of the circle is the same as the height a and in contact with the inclined surface 21a, as shown in FIGS. 3 and 4.

Comparative Experimental Example 1

Figure 28:
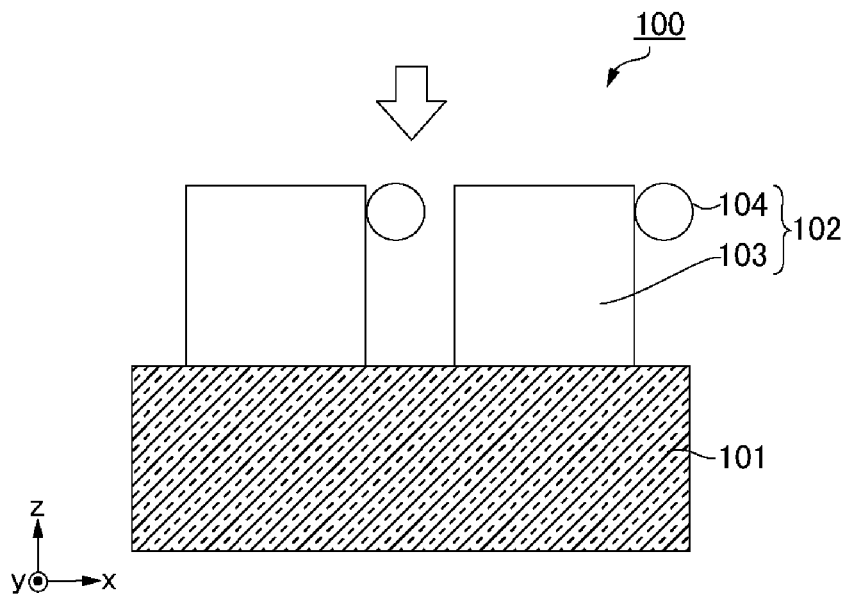
FIG. 28 is a cross-sectional schematic diagram of the polarizer of Comparative Experimental Example 1.

The shape of the xz cross-section of the polarizer of Comparative Experimental Example 1 is shown in FIG. 28. The material of the polarizer 100 of Comparative Experimental Example 1 is similar to that of Experimental Examples 1-1 to 1-4 in that the transparent substrate 101 and the base-shaped portion 103 are both made of quartz and the protruding portion 104 is made of Ge, but the xz cross-section is rectangular, which is different from that of Experimental Examples 1-1 to 1-4.

The shape of the base-shaped portion 103 of Comparative Experimental Example 1 has a height a of 70 nm, a width b of 100 nm, a pitch P of 141 nm, and an inclination angle θ of 90°. The shape of the protruding portion 104 in Comparative Experimental Example 1 has a circular cross section and the radius thereof is 15 nm. For the position of the protruding portion 104 in the base-shaped portion 103, the outermost circumference of the circle is the same as the height a and is in contact with the inclined surface 103a, as shown in FIG. 28.

Figure 29:
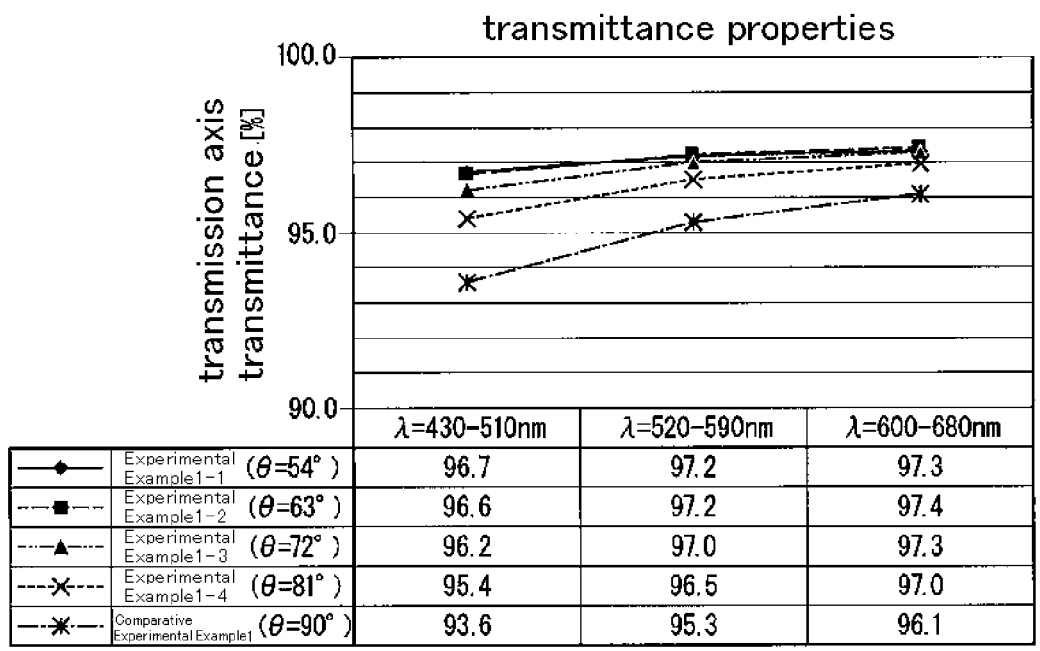
FIG. 29 is a graph showing the average value of the transmission axis transmittance in each wavelength band for the polarizers of Experimental Examples 1-1 to 1-4 and Comparative Experimental Example 1.

FIG. 29 is a graph showing the average value of the transmission axis transmittance in each wavelength band for the polarizers of Experimental Examples 1-1 to 1-4 and Comparative Experimental Example 1. The horizontal axis shows the wavelength λ (nm), and the vertical axis shows the transmission axis transmittance Tp (%). Here, the transmission axis transmittance Tp means the transmittance of polarization wave (TM wave) in the transmission axis direction (x-direction) incident on the polarizer.

As shown in FIG. 29, the polarizer of the present technology improves the transmission axis transmittance in each visible light region (red band: wavelength λ=600 to 680 nm, green band: wavelength λ=520 to 590 nm, blue band: wavelength λ=430 to 510 nm) by decreasing the tilt angle θ compared to the polarizer of Comparative Experimental Example 1.

For the same height a and width b, the tapered shape of the base-shaped portion 121 was found to have better optical properties than the rectangular shape. In addition, for the same height a and width b, the triangular xz cross-section was found to have better optical properties than the trapezoidal. In addition, when the height a and width b are the same and the xz cross-section is trapezoidal, the optical properties were found to be better when the inclination angle θ is small.

Experimental Examples 2-1 to 2-5

The shapes of the polarizers in Experimental Examples 2-1 to 2-5 are shown in FIG. 3. In the polarizers of Experimental Examples 2-1 to 2-5, the transparent substrate 21 and the base-shaped portion 23 are both made of quartz, and the protruding portion 24 is made of Ge.

The shapes of the polarizers in Experimental Examples 2-1 to 2-5 all have the same width b of 100 nm and pitch P of 141 nm, while the heights a are, in order, 50 nm, 70 nm, 90 nm, 110 nm, and 130 nm (consequently, the inclination angles θ are, in order, 54°, 45°, 61°, 66°, and 69°). The shapes of the protruding portions 24 in Experimental Examples 1-1 to 1-4 all have circular cross sections and the radius thereof is 15 nm. For the position of the protruding portion 24 in the base-shaped portion 23, the outermost circumference of the circle is the same as the height a and is in contact with the inclined surface 23a, as shown in FIG. 3.

Figure 30:
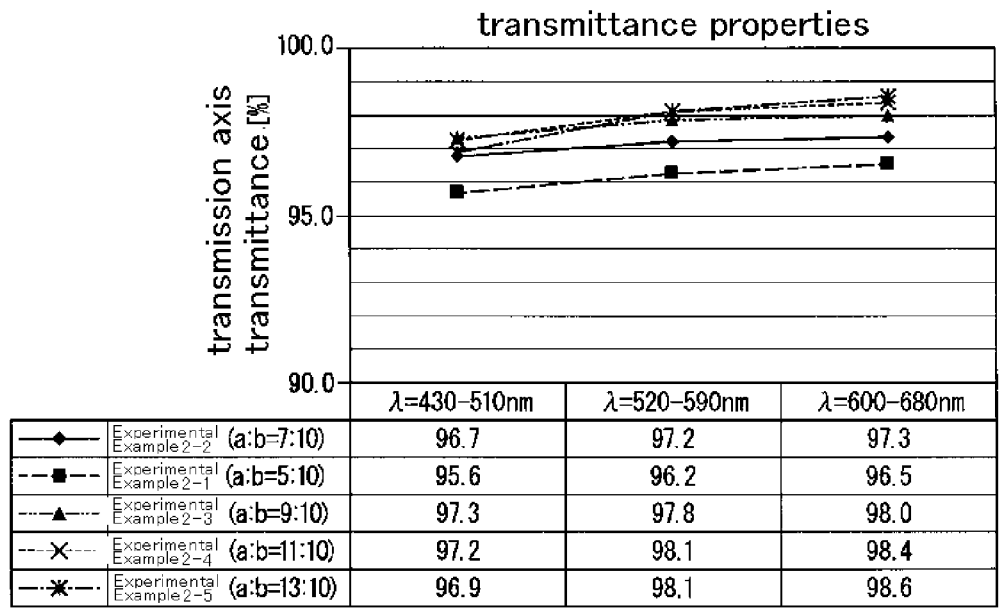
FIG. 30 is a graph showing the average value of the transmission axis transmittance in each wavelength band for the polarizers of Experimental Examples 2-1 to 2-5.

FIG. 30 is a graph showing the average value of the transmission axis transmittance in each wavelength band for the polarizers of Experimental Examples 2-1 to 2-5. The horizontal axis shows the wavelength λ (nm), and the vertical axis shows the transmission axis transmittance Tp (%). According to FIG. 30, the ratio of height a to width b (a/b) is preferably greater than 1/2, and more preferably 7/10, with 9/10, 11/10, and 13/10 being preferred over 7/10.

Experimental Examples 3-1 to 3-5

The shapes of the polarizers in Experimental Examples 3-1 to 3-5 are shown in FIG. 3. In the polarizers of Experimental Examples 3-1 to 3-5, the transparent substrate 21 and the base-shaped portion 23 are both made of sapphire, and the protruding portion 24 is made of Ge.

The shapes of the polarizers in Experimental Examples 3-1 to 3-5 all have the same width b of 100 nm and pitch P of 141 nm, while the heights a are, in order, 50 nm, 70 nm, 90 nm, 110 nm, and 130 nm (consequently, the inclination angles θ are, in order, 54°, 45°, 61°, 66°, and 69°). The shapes of the protruding portions 24 in Experimental Examples 3-1 to 3-5 all have circular cross sections and the radius thereof is 15 nm. For the position of the protruding portion 24 in the base-shaped portion 23, the outermost circumference of the circle is the same as the height a and is in contact with the inclined surface 23a, as shown in FIG. 3.

Figure 31:
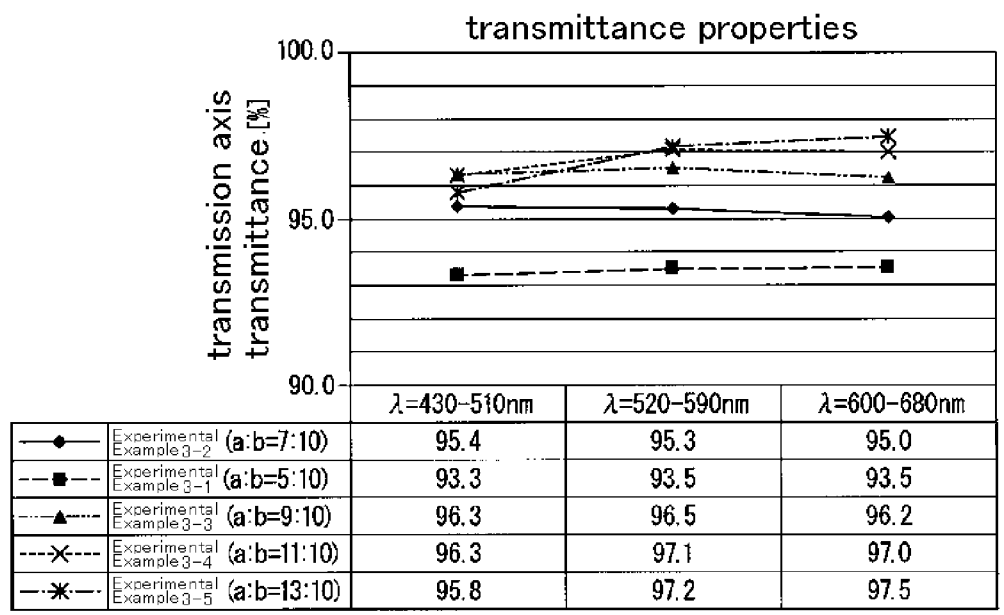
FIG. 31 is a graph showing the average value of the transmission axis transmittance in each wavelength band for the polarizers of Experimental Examples 3-1 to 3-5.

FIG. 31 is a graph showing the average value of the transmission axis transmittance in each wavelength band for the polarizers of Experimental Examples 3-1 to 3-5. The horizontal axis shows the wavelength λ (nm), and the vertical axis shows the transmission axis transmittance Tp (%). According to FIG. 31, the ratio of height a to width b (a/b) is preferably greater than 1/2, and more preferably 7/10, with 9/10, 11/10, and 13/10 being preferred over 7/10. This is the same as the polarizers of Experimental Examples 2-1 to 2-5, and it was found that such characteristics remain the same even when the materials of the transparent substrate and the base-shaped portion are changed from crystal to sapphire.

Experimental Examples 4-1 to 4-5

The shapes of the polarizers in Experimental Examples 4-1 to 4-5 are shown in FIG. 3. In the polarizers of Experimental Examples 4-1 to 4-5, the transparent substrate 21 is made of sapphire, the base-shaped portion 23 is made of $SiO_2$, and the protruding portion 24 is made of Ge.

The shapes of the polarizers in Experimental Examples 4-1 to 4-5 all have the same width b of 100 nm and pitch P of 141 nm, while the heights a are, in order, 50 nm, 70 nm, 90 nm, 110 nm, and 130 nm (consequently, the inclination angles θ are, in order, 54°, 45°, 61°, 66°, and 69°). The shapes of the protruding portions 24 in Experimental Examples 4-1 to 4-5 all have circular cross sections and the radius thereof is 15 nm. For the position of the protruding portion 24 in the base-shaped portion 23, the outermost circumference of the circle is the same as the height a and is in contact with the inclined surface 23a, as shown in FIG. 3.

Figure 32:
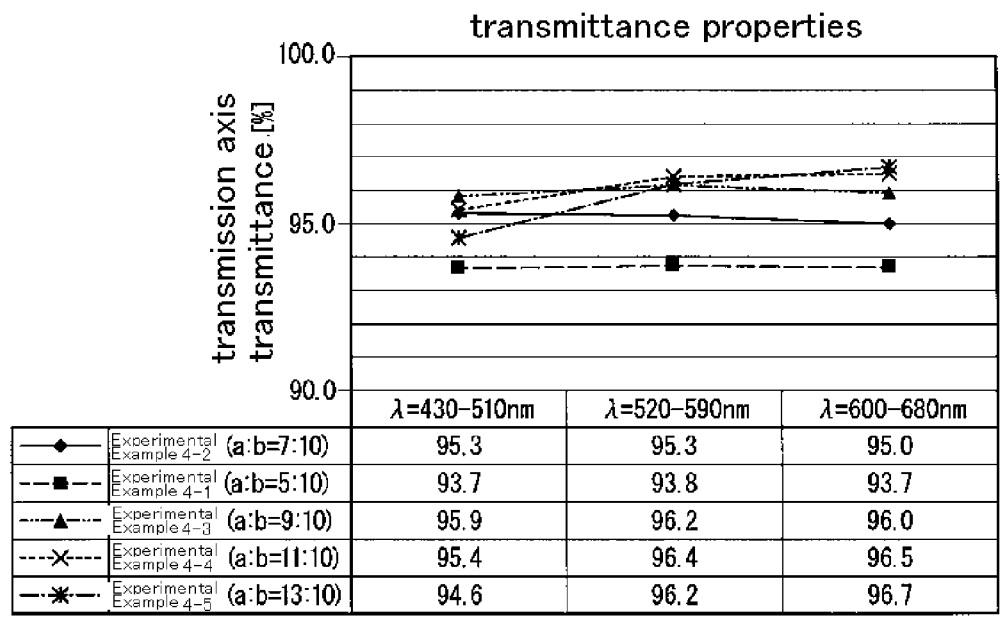
FIG. 32 is a graph showing the average value of the transmission axis transmittance in each wavelength band for the polarizers of Experimental Examples 4-1 to 4-5.

FIG. 32 is a graph showing the average value of the transmission axis transmittance in each wavelength band for the polarizers of Experimental Examples 4-1 to 4-5. The horizontal axis shows the wavelength λ (nm), and the vertical axis shows the transmission axis transmittance Tp (%). According to FIG. 32, for all of the visible light regions (red band: wavelength λ=600 to 680 nm, green band: wavelength λ=520 to 590 nm, blue band: wavelength λ=430 to 510 nm), the ratio of height a to width b (a/b) exceeding 1/2 is preferred because this improves the transmission axis transmittance. In addition, for all of the visible light regions, the shape of a/b being 7/10 or more is preferred because this improves the transmission axis transmittance. Further, for all of the visible light regions, the configurations with a/b of 9/10 and 11/10 are preferred over the configuration with a/b of 7/10. For the green band (wavelength λ=520 to 590 nm) and the blue band (λ=430 to 510 nm), the configuration with a/b of 13/10 is preferred over the configuration with a/b of 7/10.

Experimental Examples 5-1 to 5-5

The shape of the polarizer in Experimental Examples 5-1 to 5-3 is a laminate of a first substrate made of $SiO_2$ and a second substrate made of sapphire instead of the transparent substrate 21 shown in FIG. 3. The base-shaped portion 23 is made of $SiO_2$ and the protruding portion 24 is made of Ge. The polarizers of Experimental Examples 5-1 to 5-3 have a thickness d1 of the first substrate of 35 nm, 70 nm, and 105 nm, respectively, and a thickness d2 of the second substrate of 0.7 mm.

The shape of the polarizer in Experimental Example 5-4 is shown in FIG. 3, where the transparent substrate 21 is made of sapphire, the base-shaped portion 23 is made of $SiO_2$, and the protruding portion 24 is made of Ge. The thickness of the transparent substrate 21 is 0.7 mm.

The shape of the polarizer in Experimental Example 5-5 is shown in FIG. 3, where the transparent substrate 21 and the base-shaped portion 23 are both made of sapphire, and the protruding portion 24 is made of Ge. The thickness of the transparent substrate 21 is 0.7 mm.

The shapes of the protruding portions 24 in Experimental Examples 5-1 to 5-5 all have circular cross sections and the radius thereof is 15 nm. For the position of the protruding portion 24 in the base-shaped portion 23, the outermost circumference of the circle is the same as the height a and is in contact with the inclined surface 23a, as shown in FIG. 3.

In the simulation, the incident light was incident from the substrate side.

Figure 33:
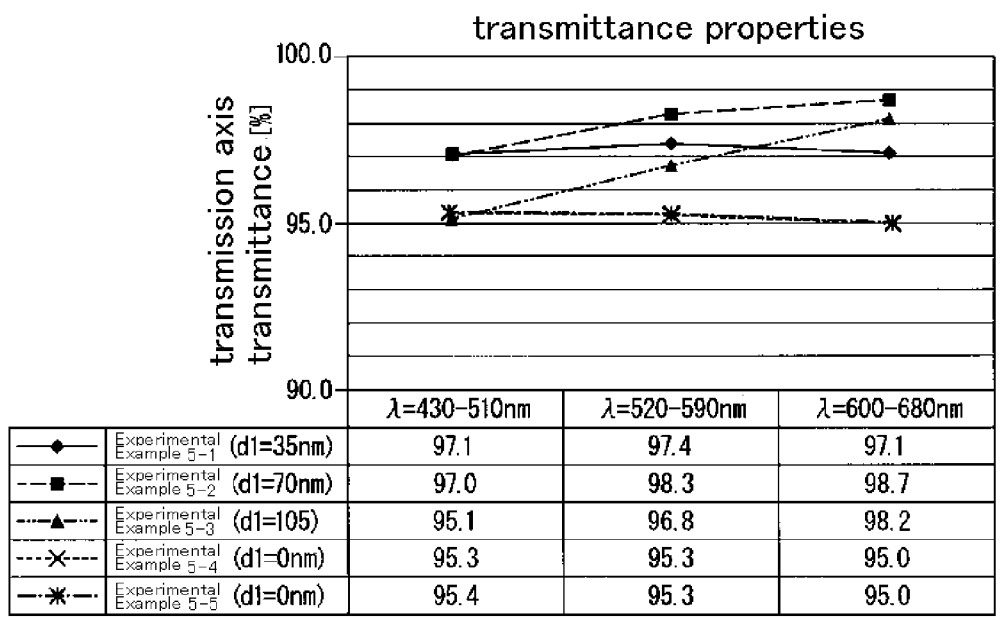
FIG. 33 is a graph showing the average value of the transmission axis transmittance in each wavelength band for the polarizers of Experimental Examples 5-1 to 5-5.

FIG. 33 is a graph showing the average value of the transmission axis transmittance in each wavelength band for the polarizers of Experimental Examples 5-1 to 5-5. The horizontal axis shows the wavelength λ (nm), and the vertical axis shows the transmission axis transmittance Tp (%). According to FIG. 33, in the polarizers of Experimental Examples 5-1 to 5-2, where the transparent substrate is a two-layer laminate and the first substrate on the base-shaped portion side is made of the same material as the base-shaped portion, for the whole band in the visible light region (red band: wavelength λ=600 to 680 nm, green band: wavelength λ=520 to 590 nm, blue band: wavelength λ=430 to 510 nm)), the transmission axis transmittance was improved compared to the polarizers of Experimental Examples 5-4 and 5-5, where the transparent substrate was a single layer. The transmission axis transmittance of the polarizer of Experimental Example 5-3 was also improved in the green and blue bands compared to the polarizers of Experimental Examples 5-4 and 5-5, in which the transparent substrate was a single layer. Therefore, from the viewpoint of improving transmission axis transmittance, it is preferable to use a two-layer laminate as a transparent substrate, where the first substrate on the base shape side is made of the same material as the base-shaped portion.

4. Second Experimental Example

In the second experimental example, the optical properties of the main polarizer on the emission side were verified.

Simulation

Simulations were performed using the polarizers shown in FIG. 5 as models for the polarizers of the present technology. More specifically, the optical properties of the polarizer were verified by electromagnetic field simulation using the Rigorous Coupled Wave Analysis (RCWA) method.

Figure 34:
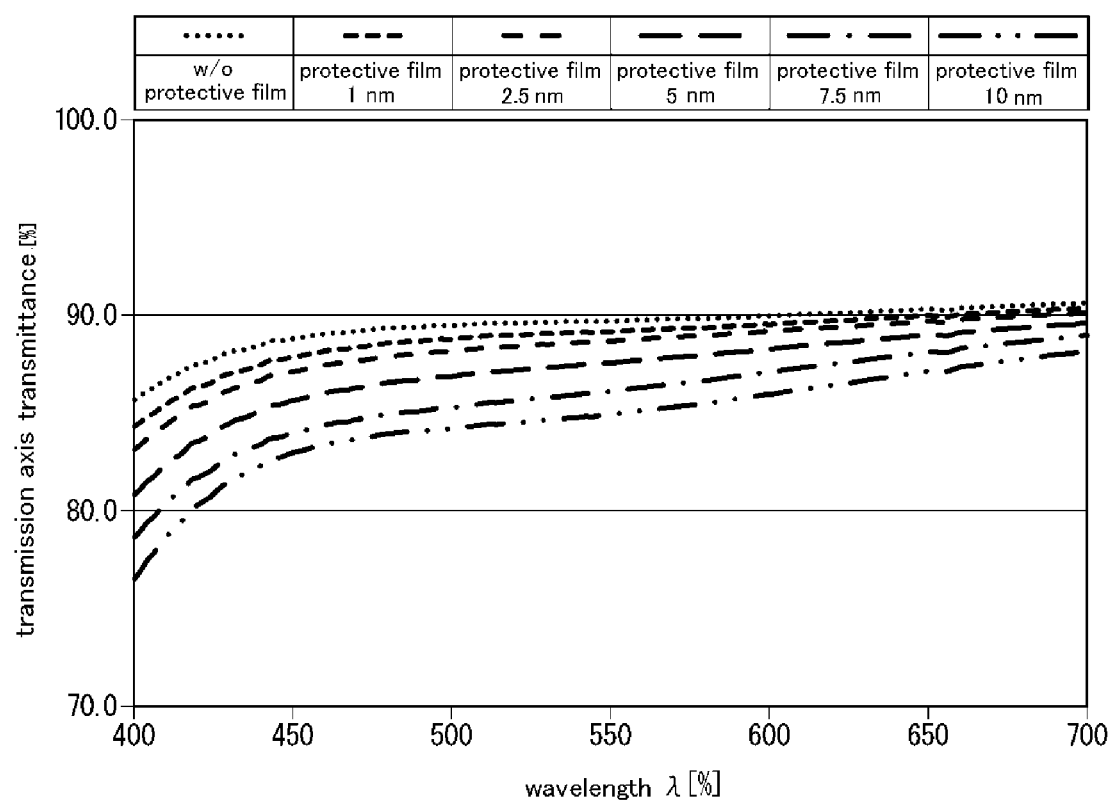
FIG. 34 is a graph showing the transmission axis transmittance in optical properties of the polarizers calculated by simulation.

FIG. 34 is a graph showing the spectral waveforms of the transmission axis transmittance in the visible light region (red band: wavelength λ=600 to 680 nm, green band: wavelength λ=520 to 590 nm, blue band: wavelength λ=430 to 510 nm) obtained by simulation using the polarizer shown in FIG. 5 as a model. The horizontal axis shows the wavelength λ (nm), and the vertical axis shows the transmission axis transmittance (%). Here, the transmission axis transmittance means the transmittance of polarized light (TM wave) in the transmission axis direction (x-axis direction) incident on the polarizer.

In the polarizer model, the used parameters and materials were:
transparent substrate: alkali-free glass, thickness of 0.7 mm;
reflection layer: Al, thickness of 250 nm, width of 35 nm;
dielectric layer: $SiO_2$, thickness of 5 nm, width of 35 nm;
absorption layer: FeSi, thickness of 25 nm, width of 35 nm; and
anti-reflection layer: alternating $TiO_2/SiO_2$ layers, thickness of 641.15 nm, width of 35 nm, and Table 6 shows the specific layer composition. Layers 1 to 9 were arranged in order from the side closer to the transparent substrate to the side farther away.

The grid had a height h of (280+protective film thickness) nm, a width w of (35+protective film thickness×2) nm, and a pitch p of (141 nm).

TABLE 6

| | material | thickness (nm) |
|---|---|---|
| first layer | $SiO_2$ | 170.99 |
| second layer | $TiO_2$ | 12.76 |
| third layer | $SiO_2$ | 33.72 |
| fourth layer | $TiO_2$ | 121.52 |
| fifth layer | $SiO_2$ | 36.77 |
| sixth layer | $TiO_2$ | 25.13 |
| seventh layer | $SiO_2$ | 39.09 |
| eighth layer | $TiO_2$ | 114.39 |
| ninth layer | $SiO_2$ | 86.78 |
| total | | 641.15 |

In the polarizer model, the protective film (indicated by symbols 44A and 44B in FIG. 5) was made of $Al_2O_3$ and the film thickness (thickness) was 1 nm, 2.5 nm, 5 nm, 7.5 nm, and 10 nm. As a comparative experimental example, a case without a protective film was also simulated and is shown in FIG. 34.

Although the protective film can improve the durability of the polarizer, FIG. 34 shows that as the film thickness increases, the transmission axis transmittance decreases in the whole band in the visible light region, with a particularly large decrease on the short wavelength side.

Experimental Examples 1-3, Comparative Experimental Example

Figure 35:
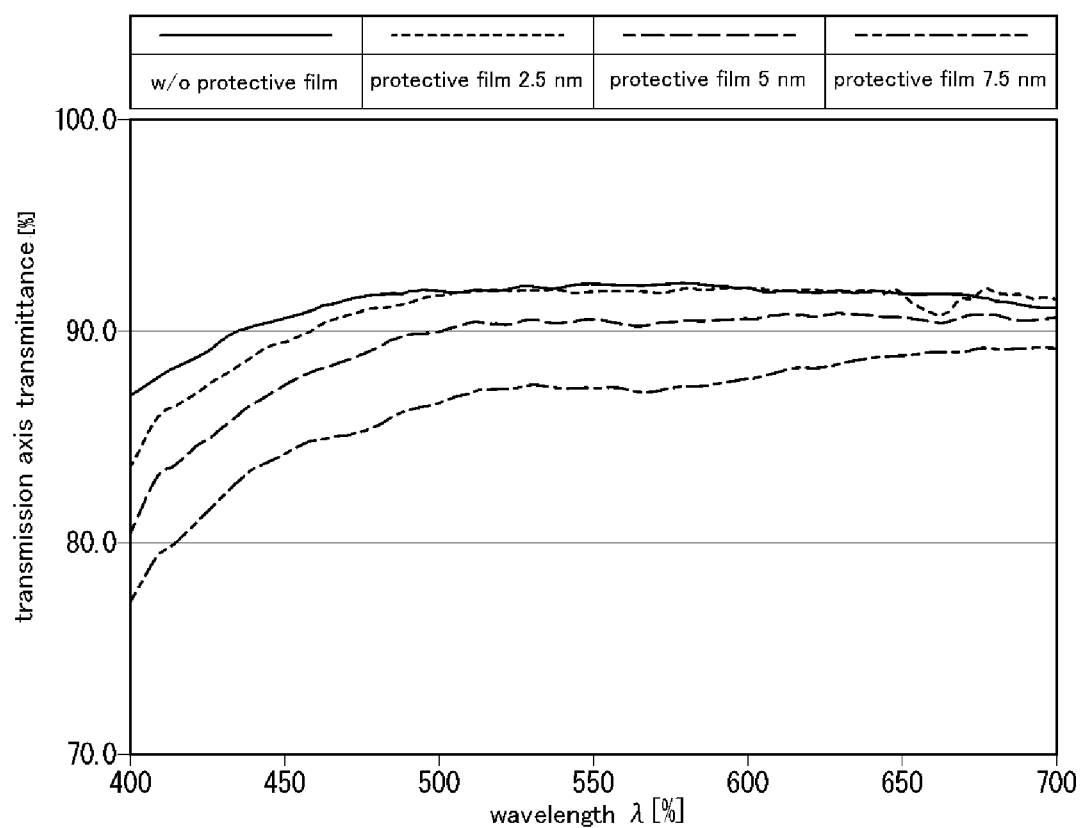
FIG. 35 is a graph showing the results of the actual measurement of the transmission axis transmittance for Experimental Examples 1 to 3.

Actual polarizers were fabricated with the 2.5 nm protective film (Experimental Example 1), the 5 nm protective film (Experimental Example 2), and the 7.5 nm protective film (Experimental Example 3), and with the other parameters as in the simulation above, to measure transmission axis transmittance. The results are shown in FIG. 35. The transmission axis transmittance was also measured for a polarizer without a protective film (comparative experimental example), and the results are shown in FIG. 35. It can be seen that the simulation results shown in FIG. 34 reflect well the optical properties of the actual polarizer.

According to the results in FIGS. 34 and 35, in the case where the transmission axis transmittance is required to be 80% or more at all wavelengths from 400 to 700 nm, the thickness of the protective film should be 5 nm or less. In the case where the transmission axis transmittance is required to be 80% or more at all wavelengths from 430 to 700 nm, the thickness of the protective film should be 10 nm or less.

Figure 36:
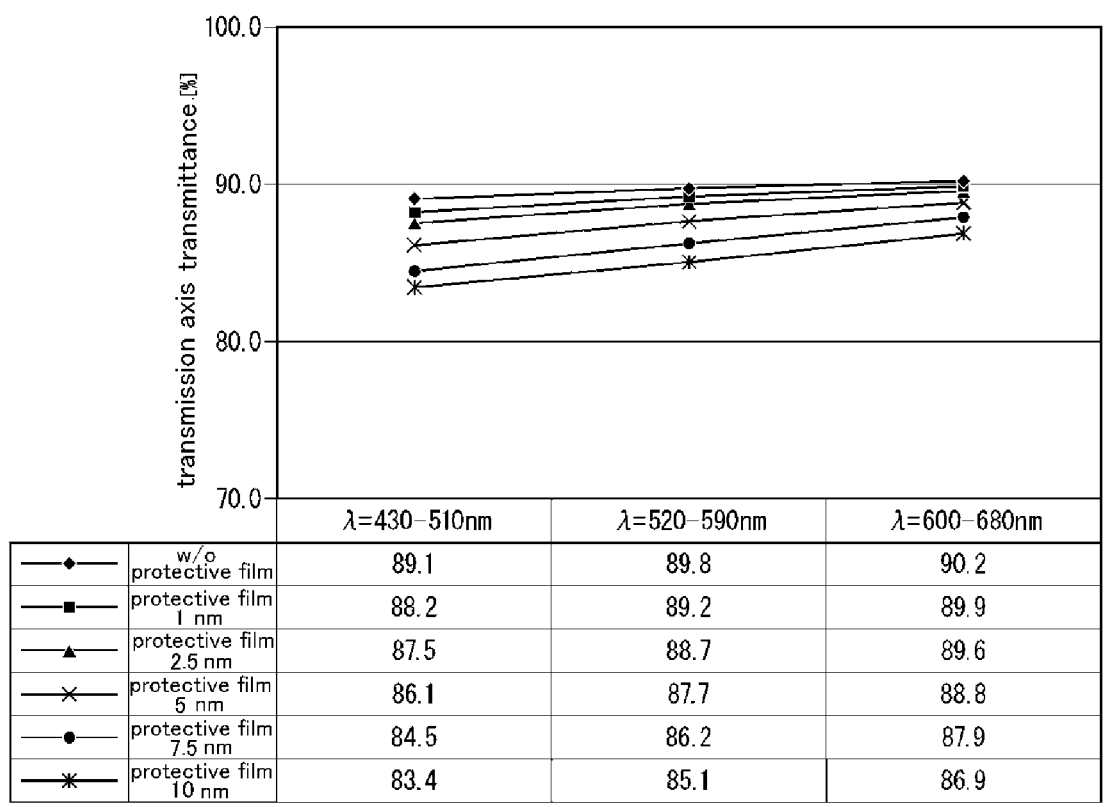
FIG. 36 is a graph showing the average transmission axis transmittance in each wavelength band of the transmission axis transmittance calculated by simulation for the polarizer.
Figure 37:
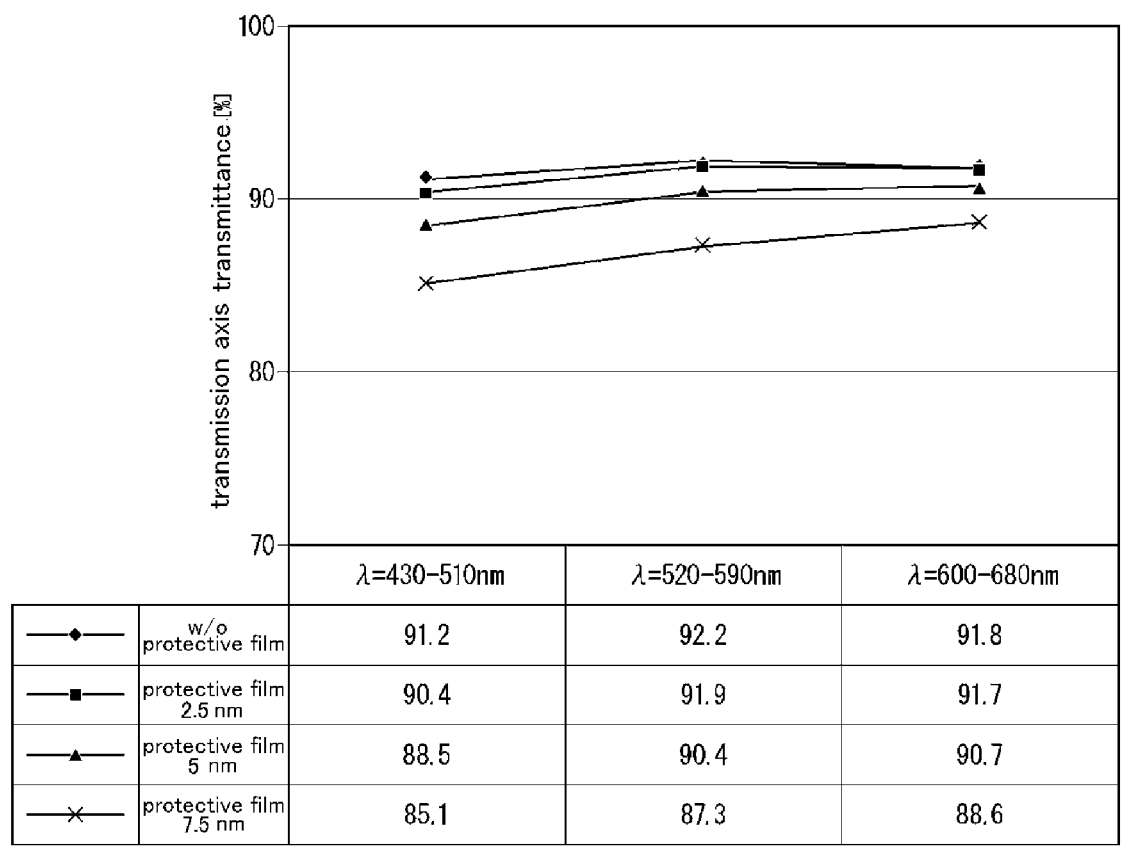
FIG. 37 is a graph showing the results of the actual measurement of the average transmission axis transmittance per wavelength band for Experimental Examples 1 to 3.

FIG. 36 is a graph showing the average transmission axis transmittance for each wavelength band obtained by simulation, and FIG. 37 is a graph showing the average transmission axis transmittance for each wavelength band actually measured for the polarizers of Experimental Examples 1 to 3 and Comparative Experimental Examples. The graphs in FIG. 37 show that the simulation results shown in FIG. 36 well reflect the actual optical properties of the polarizers.

According to FIG. 36 and FIG. 37, in the case where the average transmission axis transmittance is required to be 86% or more in the whole band of red, green, and blue regions, the thickness of the protective film should be 5 nm or less. In the case where the average transmission axis transmittance is required to be 90% or more in the whole band of red, green, and blue regions, the thickness of the protective film should be 2.5 nm or less.

The heat resistance evaluation was conducted for polarizers actually fabricated as polarizers according to the present technology. The heat resistance evaluation was performed at 300° C. in a clean oven, and the contrast, which is an optical property of the polarizer, was evaluated based on the change rate from the initial properties, i.e., the properties before the polarizer was placed in the clean oven. The contrast can be calculated as transmission axis transmittance/absorption axis transmittance, and the absorption axis transmittance refers to the transmittance of polarized light (TE wave) in the direction of the absorption axis (Y axis) incident on the polarizer. The contrast change rate is suitable for capturing the effect on the thermal resistance of the polarizer.

Figure 38:
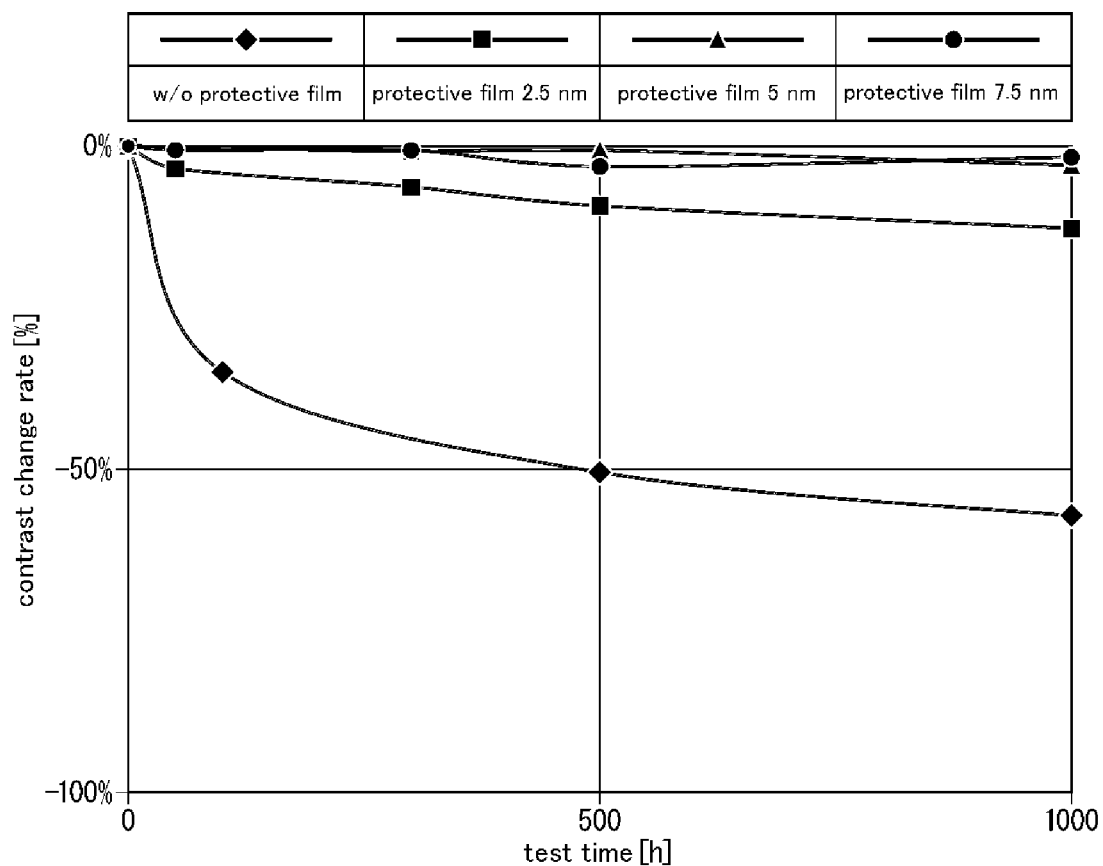
FIG. 38 is a graph comparing the contrast in optical properties of actually fabricated polarizers by heat resistance evaluation.

FIG. 38 is a graph comparing the contrast in optical properties of actually fabricated polarizers by heat resistance evaluation. The horizontal axis shows the test time (time placed in a clean oven) and the vertical axis shows the contrast change rate; the case of incident light in the green band of the visible light region (wavelength=520 to 590 nm) is used as an example. In FIG. 38, the results for the case without protective film are also shown.

As shown in FIG. 38, as the protective film becomes thicker, the contrast change rate becomes smaller and the durability of the polarizer improves. Although the case of incident light in the green band is shown as an example, the same effect was achieved with light in the red band (wavelength=600 to 680 nm) or blue band (wavelength=430 to 510 nm), with only a slight change in the contrast change rate. The results in FIG. 38 show that high heat resistance can be maintained when the thickness of the protective film is 2.5 nm or more.

From the above results, it was found that polarizers of the present technology with protective films on the surface of the convex portion and the surface of the anti-reflection layer can maintain the durability and also improve light transmission properties, and the film thickness of 2.5 nm or less is desirable to avoid degradation of optical properties, while the film thickness of 2.5 nm or more is desirable to maintain high heat resistance. In forming the protective film, it is desirable to design the protective film and anti-reflection layer taking into account the effect on the anti-reflection layer as well as the plurality of convex portions.

REFERENCE SIGNS LIST 10 optical device, 11 light source, 12 incident-side polarizing element, 13 optical modulating element, 14 emission-side first polarizing element, 15 emission-side second polarizing element, 20 polarizer, 21 transparent substrate, 21a main surface, 22 convex portion, 23 base-shaped portion, 24 protruding portion, 30 polarizer, 31 transparent substrate, 31a main surface, 32 convex portion, 33 base-shaped portion, 34 protruding portion, 40 polarizer, 41 transparent substrate, 41a first side, 41b second side, 42 convex portion, 42A reflection layer, 42B dielectric layer, 42C absorption layer, 43 anti-reflection layer, 44A, 44B protective film, 50 liquid crystal projector, 51R, 51G, 51B incident-side polarizing element, 52R, 52G, 52B liquid crystal panel, 53R, 53G, 53B emission-side pre-polarizing element, 54R, 54G, 54B emission-side main polarizing element, 100 polarizer, 101 transparent substrate, 102 convex portion, 103 base-shaped portion, 104 protruding portion

The invention claimed is:

1. An optical device comprising a light source, an incident-side polarizing element, an optical modulating element, an emission-side first polarizing element, and an emission-side second polarizing element, wherein
the emission-side first polarizing element has a wire-grid structure and comprises a plurality of convex portions arranged on one side of a transparent substrate and spaced apart from each other at a pitch shorter than the wavelength of light in the used band of the light source, the convex portions are lattice-shaped convex portions extending in a predetermined direction, and the lattice-shaped convex portions comprise, in order from the transparent substrate side, a base-shaped portion with a width in a cross-section orthogonal to the predetermined direction becomes narrower toward the tip and a protruding portion protruding from the base-shaped portion and having absorption properties for the wavelength of light in the used band,
the emission-side second polarizing element has a wire-grid structure and comprises a plurality of convex portions arranged on one side of the transparent substrate and spaced apart from each other at a pitch shorter than the wavelength of light in the used band of the light source, and the convex portions are lattice-shaped convex portions extending in a predetermined direction, and the lattice-shaped convex portions comprises, in order from the transparent substrate side, a reflection layer, a dielectric layer, and an absorption layer,
the rotation angle of the orthogonal axis of the emission-side first polarizing element relative to the orthogonal axis of the incident-side polarizing element is within ±8.5°, and
the rotation angle of the orthogonal axis of the emission-side second polarizing element relative to the orthogonal axis of the incident-side polarizing element is within ±0.7°.

2. The optical device according to claim 1, wherein in the emission-side first polarizing element, when the rotation angle of the emission-side first polarizing element relative to the orthogonal axis of the incident-side polarizing element is within ±8.5°, the P-polarization transmittance of the whole band in the visible light region is 95% or more, and the change amount in the P-polarization transmittance of the whole band in the visible light region from the position with a rotation angle of 0° is −1% or less.

3. The optical device according to claim 1, wherein
in the emission-side second polarizing element, when the rotation angle relative to the orthogonal axis of the incident-side polarizing element is within ±0.7°, the contrast ratio of the whole band in the visible light region is 1,000 or more, and the change amount in the contrast ratio of the whole band in the visible light region from the position with a rotation angle of 0° is −20% or less.

4. The optical device according to claim 1, wherein the emission-side second polarizing element further comprises an anti-reflection layer on the other side of the transparent substrate.

5. The optical device according to claim 4, wherein a surface of the convex portions and the surface of the anti-reflection layer in the emission-side second polarizing element are covered with a protective film comprising a dielectric material.

6. The optical device according to claim 5, wherein the protective film in the emission-side second polarizing element has a thickness of 10 nm or less.

7. The optical device according to claim 1, wherein the base-shaped portion in the emission-side first polarizing element is approximately triangular in a cross-section orthogonal to the predetermined direction.

8. The optical device according to claim 1, wherein the emission-side first polarizing element is provided with a phase difference compensation element on the other side of the transparent substrate.

9. The optical device according to claim 1, wherein the protruding portion in the emission-side first polarizing element comprises a material selected from the group consisting of a metal, an alloy, and a semiconductor having absorptivity for a wavelength of light in the used band.

10. A method for manufacturing an optical device comprising a light source, an incident-side polarizing element, an optical modulating element, an emission-side first polarizing element, and an emission-side second polarizing element, wherein
the emission-side first polarizing element has a wire-grid structure and comprises a plurality of convex portions arranged on one side of a transparent substrate and spaced apart from each other at a pitch shorter than the wavelength of light in the used band of the light source, the convex portions are lattice-shaped convex portions extending in a predetermined direction, and the lattice-shaped convex portions comprise, in order from the transparent substrate side, a base-shaped portion with a width in a cross-section orthogonal to the predetermined direction becomes narrower toward the tip and a protruding portion protruding from the base-shaped portion and having absorption properties for the wavelength of light in the used band, the emission-side second polarizing element has a wire-grid structure and comprises a plurality of convex portions arranged on one side of the transparent substrate and spaced apart from each other at a pitch shorter than the wavelength of light in the used band of the light source, and the convex portions are lattice-shaped convex portions extending in a predetermined direction, and the lattice-shaped convex portions comprises, in order from the transparent substrate side, a reflection layer, a dielectric layer, and an absorption layer, the method comprising:

a step of arranging the emission-side first polarizing element so that the rotation angle of the orthogonal axis of the emission-side first polarizing element relative to the orthogonal axis of the incident-side polarizing element is within ±8.5°; and a step of arranging the emission-side second polarizing element so that the rotation angle of the orthogonal axis of the emission-side second polarizing element relative to the orthogonal axis of the incident-side polarizing element is within ±0.7°.

11. The optical device according to claim 1, wherein the optical device is a transmissive liquid crystal projector.

12. The optical device according to claim 2, wherein the emission-side second polarizing element further comprises an anti-reflection layer on the other side of the transparent substrate.

* * * * *